United States Patent
Chizgi et al.

(10) Patent No.: US 9,036,526 B2
(45) Date of Patent: May 19, 2015

(54) VOICE STATE ASSISTED FRAME EARLY TERMINATION

(71) Applicant: QUALCOMM Incorporated, San Diego, CA (US)

(72) Inventors: Nate Chizgi, Sunnyvale, CA (US); Atul Arvind Salvekar, Emeryville, CA (US); Prashant Udupa Sripathi, San Jose, CA (US); Madhup Chandra, San Diego, CA (US); Sharif Ahsanul Matin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/856,322

(22) Filed: Apr. 3, 2013

(65) Prior Publication Data

US 2014/0126443 A1 May 8, 2014

Related U.S. Application Data

(60) Provisional application No. 61/723,886, filed on Nov. 8, 2012.

(51) Int. Cl.
*G08C 17/00* (2006.01)
*H04W 52/02* (2009.01)

(52) U.S. Cl.
CPC .......... *H04W 52/0229* (2013.01); *H04W 52/02* (2013.01); *Y02B 60/50* (2013.01)

(58) Field of Classification Search
CPC .......................... H04W 52/02; H04W 52/0229
USPC ......................................................... 370/311
See application file for complete search history.

(56) References Cited

U.S. PATENT DOCUMENTS

| 8,064,411 | B2 | 11/2011 | Ecclesine |
| 8,265,080 | B2 | 9/2012 | Cai et al. |
| 2009/0258664 | A1 | 10/2009 | Huan |
| 2009/0296616 | A1 | 12/2009 | Lim et al. |
| 2009/0304024 | A1 | 12/2009 | Jou et al. |
| 2010/0056229 | A1 | 3/2010 | Ying |
| 2011/0029308 | A1* | 2/2011 | Konchitsky et al. .......... 704/233 |
| 2011/0170541 | A1 | 7/2011 | Hannu et al. |
| 2012/0294159 | A1 | 11/2012 | Sridhar |

OTHER PUBLICATIONS

International Search Report and Written Opinion—PCT/US2013/069194—ISA/EPO—Feb. 21, 2014.
3GPP TR 25.929: "3rd Generation Partnership Project: Technical Specification Group Radio Access Network; Continuous connectivity for packet data users; 1.28 Mcps TDD", Version 10.0.0, Release 10, Mar. 2011, pp. 14.

* cited by examiner

*Primary Examiner* — Sai-Ming Chan
(74) *Attorney, Agent, or Firm* — Darren M. Simon

(57) ABSTRACT

The present disclosure presents a method and apparatus for reducing power consumption during a voice communication in a user equipment (UE). For example, the method may include receiving a plurality of frames associated with the voice communication. Further, such an example method may include determining whether a frame pattern based at least on the received plurality of frames corresponds to a transition from a speech burst period to a non-speech period, and disabling a portion of a receiver subsystem at the UE for at least a portion of a frame associated with the non-speech period. As such, the power consumption in a UE may be reduced.

26 Claims, 18 Drawing Sheets

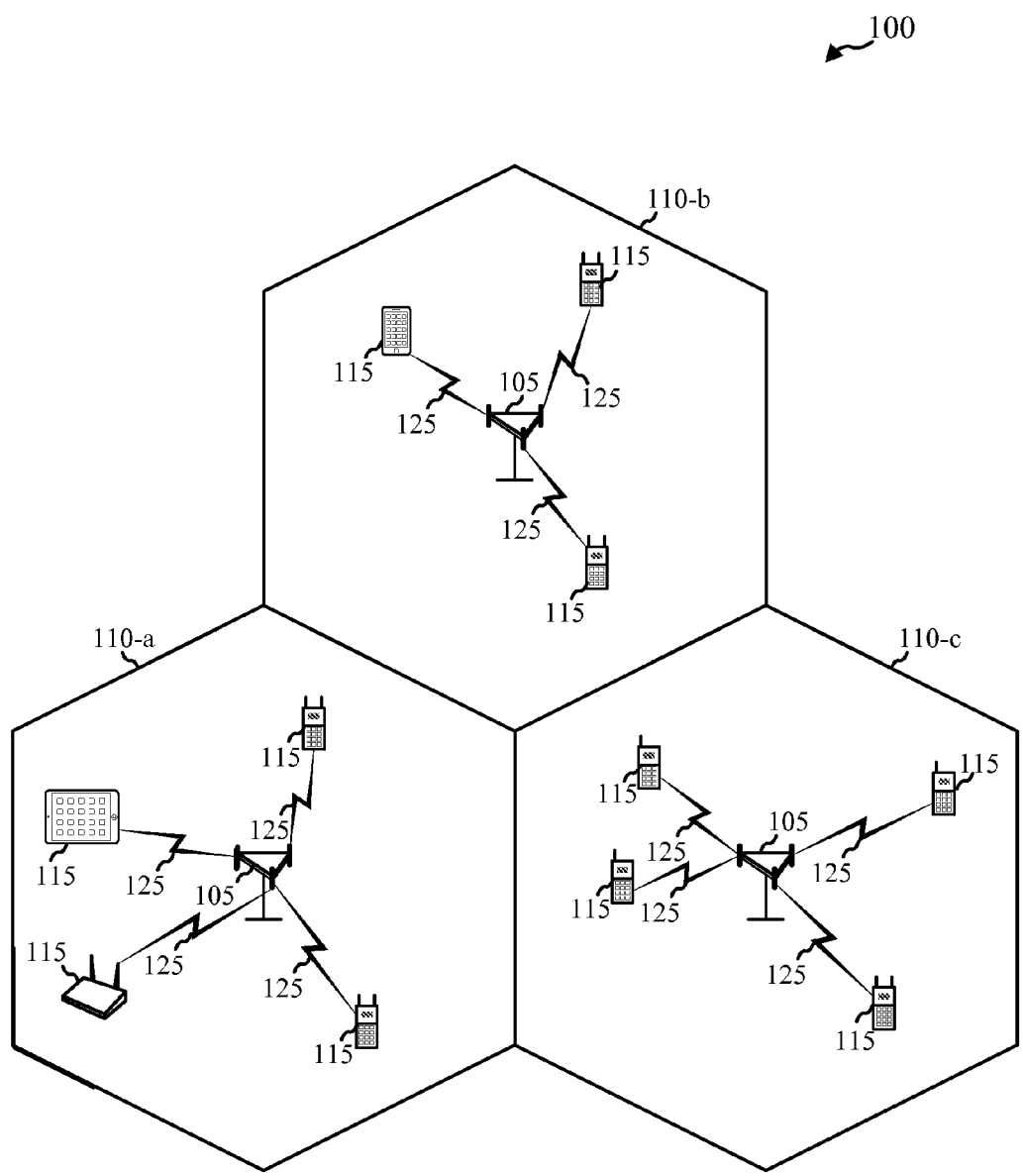
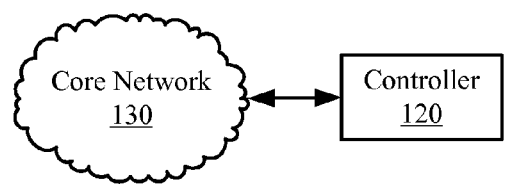
FIG. 1

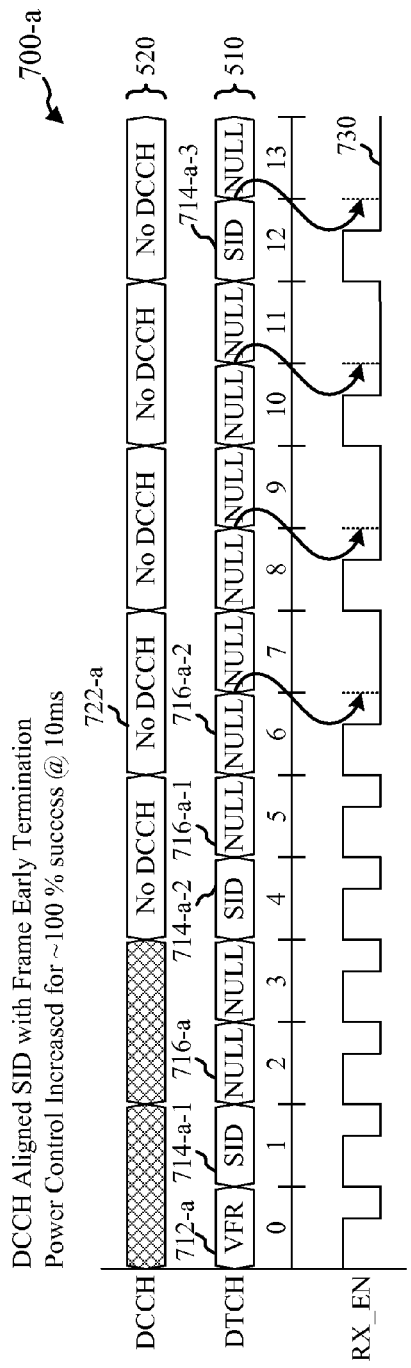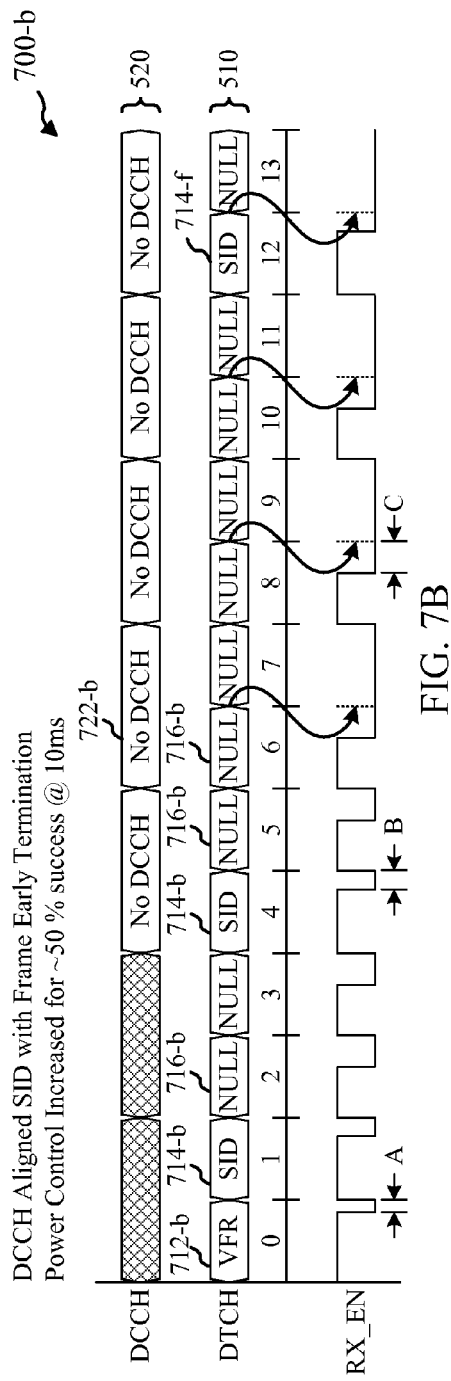

VOICE STATE ASSISTED FRAME EARLY TERMINATION

CLAIM OF PRIORITY UNDER 35 U.S.C. §119

The present application for patent claims priority to U.S. Provisional Patent Application No. 61/723,886 filed Nov. 8, 2012, entitled "Voice State Assisted Frame Early Termination," which is assigned to the assignee hereof, and hereby expressly incorporated by reference herein.

BACKGROUND

1. Field

Aspects of the present disclosure relate generally to wireless communications, and more particularly to reducing power consumption at a user equipment (UE).

2. Background

Wireless communication devices are increasingly rapidly in adoption and functionality. In particular, the capabilities of mobile devices with regard to processing power and battery life have been driven by customer dependence on mobile devices as a primary communication means. While data applications have risen in popularity along with the advanced computing capabilities of today's mobile devices, voice and other audio communication still accounts for a large percentage of mobile device use. For example, the average mobile phone subscriber used approximately 700 voice minutes per month in 2009.

Battery life of mobile devices can be an important feature for consumers. For example, "talk-time," or the time the battery lasts while using the device for voice communications, may be used as a primary selling feature for many mobile communications devices. While talk-time of a mobile device is a function of many parameters and components of the mobile device, power used in transmission and reception of wireless communications may account for a substantial portion of mobile device power usage. Many techniques have been developed for reducing power consumption in mobile devices related to wireless communications. For example, audio compression is used to reduce the amount of data that needs to be transmitted and received by the mobile device. Further, power control may be used in conjunction with channel coding of the compressed voice data to result in more robust communications at a lower transmitted power level from the mobile device. While these techniques have provided improvements, further reductions in power consumption during voice communications may be beneficial.

SUMMARY

The following presents a simplified summary of one or more aspects in order to provide a basis understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents example method and apparatus for wireless communication. For example, the present disclosure presents an example method for reducing power consumption during a voice communication in a user equipment (UE) that comprises receiving a plurality of frames associated with the voice communication. In addition, such method may include determining whether a frame pattern based at least on the received plurality of frames corresponds to a transition from a speech burst period to a non-speech period, and disabling a portion of a receiver subsystem at the UE for at least a portion of a frame associated with the non-speech period.

In an additional aspect, the present disclosure presents an example apparatus for reducing power consumption during a voice communication in a user equipment (UE) that comprises means for receiving a plurality of frames associated with the voice communication. In addition, such apparatus may include means for determining whether a frame pattern based at least on the received plurality of frames corresponds to a transition from a speech burst period to a non-speech period, and means for disabling a portion of a receiver subsystem at the UE for at least a portion of a frame associated with the non-speech period.

Moreover, the present disclosure presents an example computer program product for reducing power consumption during a voice communication in a user equipment (UE), comprising a computer-readable medium comprising code for receiving a plurality of frames associated with the voice communication. In addition, such computer program product may further include code for determining whether a frame pattern based at least on the received plurality of frames corresponds to a transition from a speech burst period to a non-speech period, and means for disabling a portion of a receiver subsystem at the UE for at least a portion of a frame associated with the non-speech period.

In a further aspect, the present disclosure presents an apparatus for reducing power consumption during a voice communication in a user equipment (UE) that includes receiving a plurality of frames associated with the voice communication. In addition, the apparatus may be further configured to determine whether a frame pattern based at least on the received plurality of frames corresponds to a transition from a speech burst period to a non-speech period, and disabling a portion of a receiver subsystem at the UE for at least a portion of a frame associated with the non-speech period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1 illustrates an example wireless communications system in which the aspects herein can be implemented;

FIG. 7A shows a timing diagram that illustrates aspects of reducing power consumption using a combination of frame pattern assisted receiver disabling and frame early termination in accordance with various aspects of the present disclosure;

FIG. 7B shows a timing diagram that illustrates aspects of reducing power consumption using a combination of frame pattern assisted receiver disabling and frame early termination in accordance with various aspects of the present disclosure;

DETAILED DESCRIPTION

Figure 2:
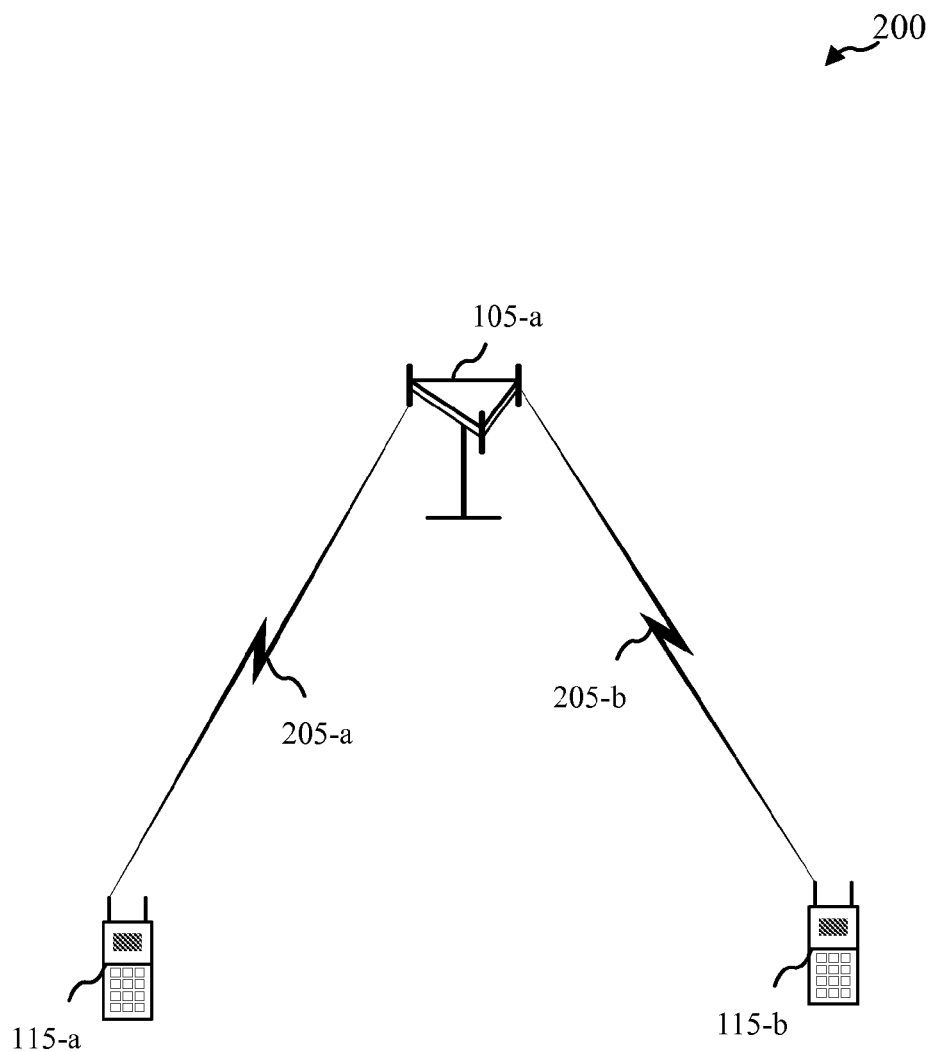
FIG. 2 illustrates another example wireless communications system in which the aspects herein can be implemented.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for reducing power consumption during a voice communication in a user equipment (UE) by receiving a plurality of frames associated with the voice communication, determining whether a frame pattern based at least on the received plurality of frames corresponds to a transition from a speech burst period to a non-speech period and disabling a portion of a receiver subsystem at the UE for at least a portion of a frame associated with the non-speech period.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a RAT may be called a Radio Access Network (RAN).

Referring to FIG. 1, a wireless system 100 is illustrated that facilitates reducing power consumption during a voice communication in a user equipment (UE). System 100 includes a plurality of base stations 10 and user equipments (UEs) 115, a base station controller 120, and a core network 130. In an example aspect, controller 120 may be integrated into core network 130 or into base stations 105. System 100 may support operation on multiple carriers (waveform signals of different frequencies). A multi-carrier transmitter can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. System 100 may be a multi-carrier W-CDMA or LTE network capable of efficiently allocating network resources.

UE 115 may be any type of mobile station, mobile device, access terminal, subscriber unit, or user equipment. UE 115 may include cellular phones and wireless communications devices, and may also include personal digital assistants (PDAs), smartphones, tablets, other handheld devices, netbooks, notebook computers, etc. Thus, the term UE should be interpreted broadly hereinafter, including the claims, to include any type of wireless or mobile communications device.

Base stations 105 may wirelessly communicate with the UEs 115 via a base station antenna. The base stations 105 may be configured to communicate with the UEs 115 under the control of the controller 120 via multiple carriers. Each of the base station 105 sites can provide communication coverage for a respective geographic area. In an aspect, base stations 105 may be referred to as a base transceiver station (BTS), an extended service set (ESS), a NodeB, eNodeB, Home NodeB, Home eNodeB, or some other suitable terminology. The coverage area for each base station 105 here is identified as 110-a, 110-b, or 110-c. The coverage area for a base station may be divided into sectors (not shown, but making up only a portion of the coverage area of the base station). The system 100 may include base stations 105 of different types (e.g., macro, micro, femto, and/or pico base stations). A macro base station may provide coverage for a relatively larger geographic area (e.g., 12 km in radius), and a femto base station may provide communication coverage for a relatively smaller geographic area (e.g., 50 m in radius). There may be overlapping coverage areas for different technologies.

The different aspects of system 100, such as the UEs 115, the base stations 105, the core network 130, and/or the controller 120 may be configured to transmit and/or receive digitized voice, speech, and/or other primarily audio communications in accordance with various aspects of the present disclosure. System 100, for example, shows transmissions 125 between UEs 115 and base stations 105. The transmissions 125 may include uplink (UL) and/or reverse link transmission, from a UE 115 to a base station 105, and/or downlink (DL) and/or forward link transmissions, from a base station 105 to a UE 115.

Referring to FIG. 2, a wireless system 200 is illustrated that facilitates reducing power consumption during a voice communication in a user equipment (UE). For example, transmissions 205-a, and/or 205-b of wireless system 200 (FIG. 2) and/or transmissions 125 of wireless system 100 (FIG. 1) may represent traffic channels that may carry voice transmissions between UEs 115 and base stations 105. The traffic channel may be connected to a circuit switched network (e.g., PSTN, etc.) at base stations 105 and/or UEs 115 to provide voice communications with other devices and/or networks.

The different aspects of system 100 and/or 200, such as the UEs 115, the base stations 105, the core network 130, and/or the controller 120 may be configured to reduce power consumption during reception of voice communications by disabling portions of receiver subsystems for certain traffic frames based on recognized frame patterns. In an aspect, a non-speech state between speech bursts may be detected based on frame patterns including SID frames. The non-speech state may include a repeated pattern of SID update frames followed by a number of NULL frames.

Figure 3:
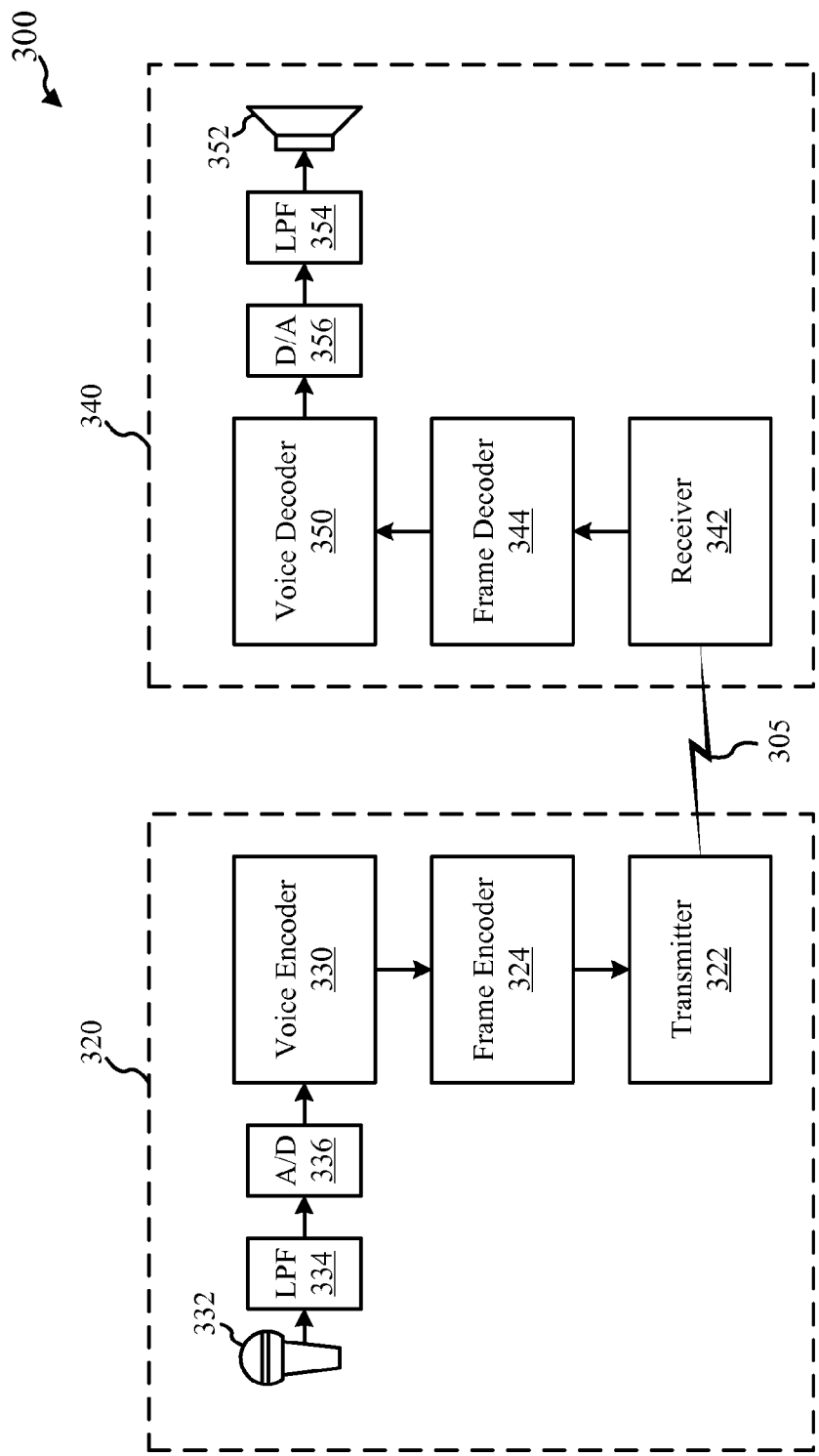
FIG. 3 illustrates a block diagram of a wireless communications system for transmitting voice communications according to the present disclosure.

FIG. 3 illustrates a system 300 for voice communications in an aspect of the present disclosure . . . . For example, FIG. 3 may illustrate voice communications from a transmitter device 320 to a receiver device 340. Transmitter device 320 and receiver device 340 may illustrate aspects of UEs 115 and/or base stations 105. At the transmitter device 320, a microphone 332 may detect speech and output a speech signal to low-pass filter 334 and analog-to-digital (A/D) converter 336 which converts the analog speech signal to a digitized speech vector.

Voice encoder 330 may receive the digitized speech vector from A/D converter 336 and convert the digitized speech vector into packets that represent time periods of the voice signal. For example, voice encoder 330 may utilize an audio codec to take voice samples and generate voice packets at a predetermined timing interval or frame rate. Audio codecs may employ audio signal processing and compression techniques to represent the voice samples using a compact bitstream. For example, audio codecs may include differential pulse code modulation (DPCM), enhanced variable rate codec (EVRC), adaptive multi-rate (AMR), code-excited linear prediction (CELP) and algebraic code-excited linear prediction (ACELP).

The voice encoder 330 may use an audio codec that employs variable coding rates and multiple compression techniques. Using variable coding rates, a time period with active speech (e.g., a speech burst) may be encoded at a full bit rate while a time period with a less complex speech pattern may be encoded at a lower bit rate. For example, the voice encoder 330 may employ full, half, quarter, eighth, and/or other bit rates for transmission of various frames based on the amount of information in the encoded speech frame.

The voice encoder 330 may employ other techniques to reduce the amount of transmitted data. For example, a voice encoder may employ voice activity detection (VAD) to identify bursts of speech activity followed by periods of inactivity. Instead of transmitting voice frames during periods of inactivity, the voice encoder may periodically transmit background noise information that can be used by the receiver to generate "comfort noise," a synthetic background noise that fills the artificial silence that would result from missing audio data during periods of speech inactivity. Comfort noise creates a more pleasing effect to the listener because it avoids sudden changes in sound level which may result in choppy sounding speech.

Frame encoder 324 may encode voice packets received from voice encoder 330 into traffic frames using various techniques for controlling errors over inherently noisy wireless communication channels. Frame encoder 324 may use, for example, interleaving, spreading, coding (e.g., CRC insertion, convolutional coding, etc.), and/or other forward error correction (FEC) techniques to generate traffic frames for transmission by transmitter 322 over the wireless transmission 305. For example, each speech packet or voice frame may be coded and modulated before being transmitted at the frame rate over the traffic channel. A traffic channel frame period may be defined by the same time period as the speech frame rate used by voice encoder 330 for encoding voice frames.

At the receiver device 340, receiver 342 may receive the wireless transmission 305 and demodulate the RF transmission signal into digital traffic frame data. Frame decoder 344 may receive the traffic frames and decode the received traffic frames to provide the corresponding voice frames to the voice decoder 350. Frame decoder 344 may perform decoding and/or redundancy checking (e.g., CRC, etc.) to determine if the traffic frames are received correctly. The voice decoder 350 may generate a digital voice signal from the packetized voice frames and the digitized voice signal may be output such that a user can hear the transmitted voice signal through digital-to-analog (D/A) converter 356, LPF 354, and speaker 352.

Channel conditions such as interference seen by wireless transmission 305 may cause bit errors in decoding of received traffic frames. A received traffic frame with insufficient frame quality (i.e., more than a certain number of bit errors) may be considered a bad frame. However, loss of a voice frame in voice applications results only in loss of a fraction of a second of audio data, which can be made unnoticeable with suitable error concealment algorithms. Therefore, voice communications may still be considered acceptable with a certain amount of bad frames. For example, a frame error rate (FER) or block error rate (BLER) of 1% may typically be considered acceptable for voice communications.

The mobile device 115 and/or base station 105 may transmit communications using a power control scheme. The power control scheme may modify transmit power to achieve an acceptable or desired FER or signal-to-interference ratio (SIR) based on long-term channel variations. For example, a transmit power setting for a mobile device may be set according to a target FER based on expected or measured channel variations such as path loss. The target FER may be determined by type of communications (e.g., voice, UDP, TCP/IP, etc.), system loading, and/or other considerations.

The power control scheme may utilize open-loop and/or closed-loop power control including an initial or target setting based on long-term channel variations and a closed-loop power control that occurs at the physical channel level (e.g., Layer 1) to substantially maintain the received power even in the presence of short-term channel variations such as fast fading. For example, the closed-loop power control may occur at a frequency within a range of 50 Hz to 2000 Hz. Closed-loop power control may be performed by adapting the transmission power during defined transmission time periods based on signal quality feedback. In some aspects, the transmission power is adaptively controlled over multiple time periods in each data frame. For example, each frame may be made up of multiple subframes or slots, where transmit power is adaptively varied for each slot based on channel quality feedback. Slots may include interleaved data and/or data redundancies to reduce the effects of temporary channel loss. For example, spreading, symbol repetition, and/or interleaving of speech data during encoding and/or generation of slots may be employed to improve the robustness of transmission of encoded slots.

Examples of wireless communications systems using closed-loop transmit power control schemes include UMTS and CDMA2000 1X systems. In UMTS systems, an outer loop power control set point may be set based on a target signal-to-noise ratio (SIR) or block error ratio (BLER). The outer-loop power control, also known as slow closed-loop power control, may be set by the mobile device and/or base station and may be changed at a rate of 10-100 Hz. Inner-loop power control, also known as fast closed-loop power control, may be performed in UMTS systems over multiple slots per frame (e.g., 15 slots per 10 ms frame, 30 slots per 20 ms frame, etc.). In CDMA2000 1X systems, closed-loop power control may be performed using an outer-loop power control set point that establishes a target FER and inner-loop power control that adjusts transmit power over subframe time periods known as power control groups (PCGs) to meet the target FER. For example, inner-loop power control may be performed at 800 Hz using 16 PCGs per 20 ms frame. While various aspects are described with reference to UMTS voice transmission using Adaptive Multi-Rate (AMR) encoding, one having ordinary skill in the art would recognize that various aspects could be applicable to a variety of Radio Access Technologies and voice encoding techniques.

Figure 4:
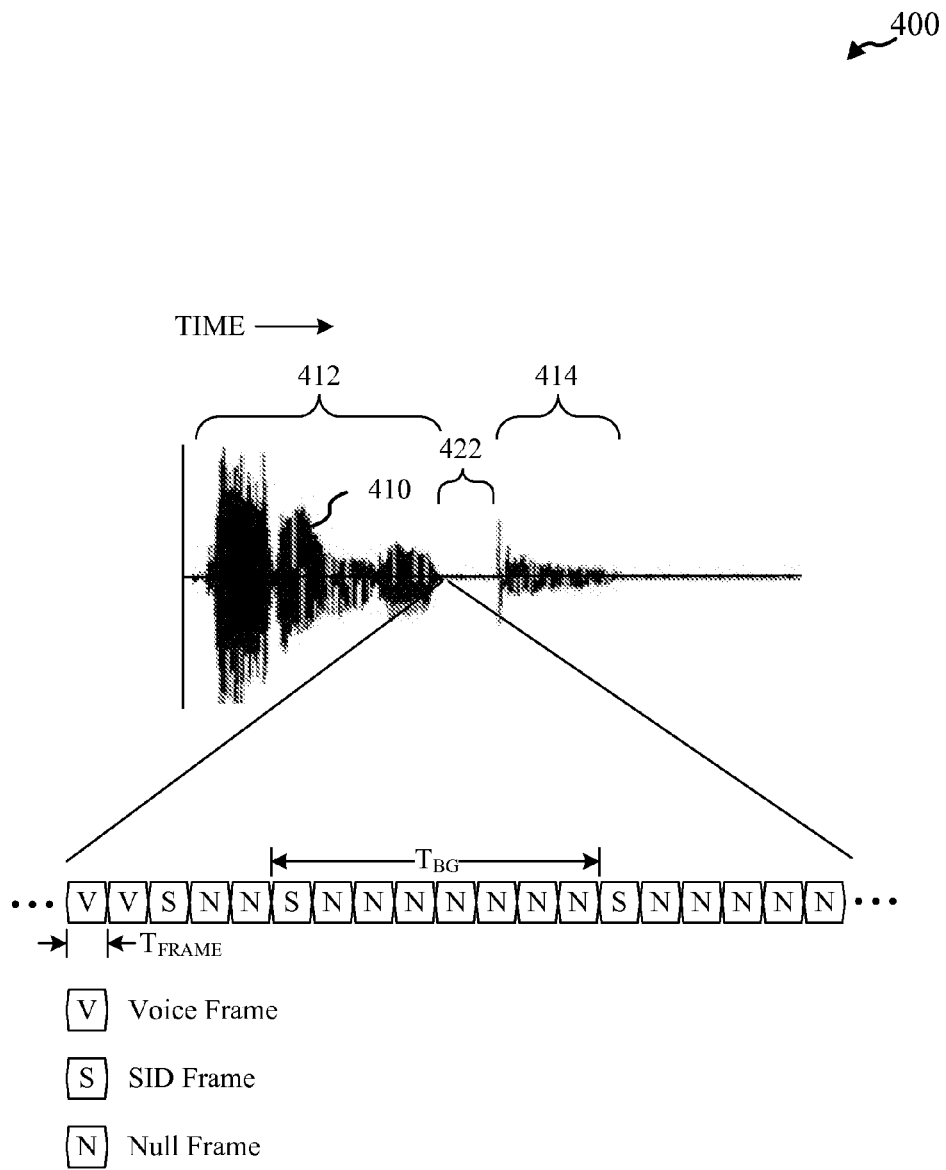
FIG. 4 shows a timing diagram of a portion of a voice signal transmitted by a wireless communications system in accordance with the present disclosure.

FIG. 4 illustrates timing diagram 400 that shows a UMTS traffic channel for voice communications (e.g., dedicated traffic channel (DTCH), etc.) carrying voice in 20 ms frames using AMR encoding. As illustrated in timing diagram 400, various VAD techniques may be applied in encoding and transmission of the sampled voice signal 410 over the example UMTS traffic channel. The voice signal 410 includes a first speech burst 412 and a second speech burst 414. At the end of the first speech burst 412, a period of silence 422 occurs where VAD techniques may determine that speech is not occurring. During silent period 422, the AMR codec may generate a pattern of one or more silence insertion descriptor (SID) frames followed by a number of NULL frames. SID frames may also indicate a transition to or from a period of silence, and/or may include background noise information for a background noise update period (e.g., SID update cycle). NULL frames may be frames that do not contain speech data. For example, NULL frames may include a specified NULL or other data pattern (e.g., all zeros, all ones, etc.) that may indicate to the voice decoder that the NULL frame should be ignored. In UMTS voice communications, the transmitted frame pattern during non-speech periods may be defined by a pattern of one SID update frame followed by seven NULL frames.

Transitions from speech bursts to non-speech periods may be indicated by one or more SID frames. For example, in UMTS voice communications, transitions from speech bursts to the non-speech state may be indicated by a SID frame followed by two NULL frames. This SID frame may be called a "transitionary SID" or "hangover SID." Subsequently, a pattern of one SID update frame followed by seven NULL frames may be followed while in the non-speech state. FIG. 4 illustrates one such transition from voice frames during speech burst 412 to the non-speech state during silent period 422. The non-speech state may correspond to time periods where the voice decoder should generate comfort noise from background noise information contained in the SID update frames. Generally, transitions from periods of silence back to voice frames may occur at any point.

On the receive side, when the voice decoder 350 detects the non-speech state, it may generate comfort noise based on the background noise information in the SID update frames. Thus, the non-speech state may also be called the background noise output state for the voice decoder. While NULL frames generated by voice encoder 330 may not include useful data, the NULL frames may be coded and modulated (e.g., CRC, etc.) by frame encoder 324 before transmission such that the receiver 342 and/or frame decoder 344 can determine if the NULL frames are received successfully.

In an aspect, multiple SID frames may be received before disabling the receiver subsystem for one or more traffic frames. For example, a background noise period between SID frames may be identified based on a pattern of SID frames followed by a certain number of NULL frames. Based on the determined pattern, the receiver subsystem may be disabled for one or more traffic frames during the identified background noise period. Furthermore, in an additional aspect, the above techniques may be combined with frame early termination techniques to disable the receiver subsystems for portions of one or more traffic frames based on a successful CRC check prior to the end of the traffic frames. In an aspect, the above techniques may be combined with NULL frame detection to detect NULL frames during the identified background noise period based on a subset of data for traffic frames.

In the following, various aspects describe disabling of the receiver of a UE based on various detected frame patterns, frame early termination techniques, and/or NULL frame detection. It should be understood that in this context, reference to disabling the receiver may mean disabling components or portions of the receiver or the receiver subsystem. For example, disabling the receiver may mean disabling components or portions of the receiver including analog front end, digital front end, digital baseband modulator, phase locked loop (PLL), demodulator front end, and/or other receiver subsystems. Disabling, in this sense, may mean turning off power, gating clocks, and/or other techniques to save power in digital and/or analog circuits as is known in the art.

Further, various aspects of the present disclosure are described based on voice transmissions in a wireless communications system, such as voice communications in a UMTS system. The s are not limited for use with only this one particular wireless communications system and/or RAT, and they may be used to advantage in other wireless communications systems employing various RATs such as LTE, Peer-to-Peer, ad hoc networks, and/or WLAN systems, as non-limiting examples.

Figure 5A:
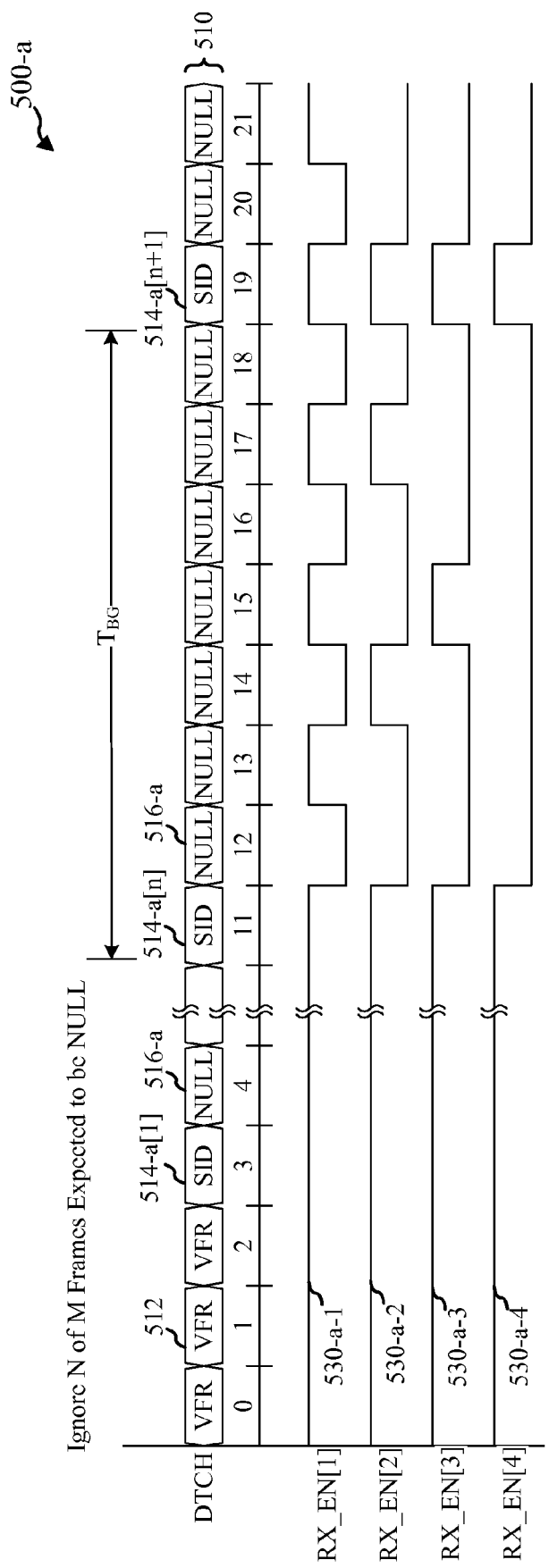
FIG. 5A shows a timing diagram that illustrates aspects of frame pattern assisted reduction in receiver power consumption in accordance with various aspects of the present disclosure.

FIG. 5A shows a timing diagram 500-*a* that illustrates receiver disabling for certain traffic frames during time periods without speech data based on frame patterns in accordance with various aspects of the present disclosure. Timing diagram 500-*a* may illustrate, for example, a time period corresponding to a transition from a speech burst to a non-speech period. Timing diagram 500-*a* illustrates traffic frames for a traffic channel 510 (e.g., dedicated traffic channel (DTCH), etc.) with frame numbers provided for reference. The illustrated signals RX_EN 530 indicate time periods for which portions of a receiver may be disabled according to various s. For example, signals RX_EN 530 may illustrate active-high enable signals for the receiver according to various s, meaning that the receiver may be disabled during low portions of one or more of signals RX_EN 530.

Initially in timing diagram 500-*a*, a first voice frame 512 is received on traffic channel 510 and decoded. Subsequently, a SID frame 514-*a*[1] is received that indicates a transition to a period without speech data. The non-speech period may include SID frames 514-*a* followed by a certain number of NULL frames 516-*a*. In the example illustrated in timing diagram 500-*a*, during the non-speech state each SID frame 514-*a* is followed by seven NULL frames 516-*a*. In this example, one SID frame 514 followed by seven NULL frames may be called a cycle of the traffic frame pattern in the non-speech state.

At the receiver side, the decoder may detect the transition to a time period without speech data based on the received traffic frame pattern including the SID frames. In some s, the decoder may determine the traffic frame pattern for the non-speech state based on a predefined SID update cycle. For example, the audio codec and/or traffic frame encoding for the communication channel may define the SID update cycle of the traffic frame pattern in the non-speech state. Further in an example aspect, the decoder may detect the traffic frame pattern for the non-speech state based on receiving and decoding one or more SID update cycles including one SID frame 514-*a* followed by a certain number of NULL frames 516-*a*. Waiting for multiple SID update periods may confirm that the SID update frames 514-*a* are following a known pattern before disabling the receiver for traffic frames.

Once the frame pattern is determined, the receiver may be disabled for one or more frames expected to be NULL frames within one or more cycles of the traffic frame pattern. The RX_EN signals illustrated in FIG. 5A illustrate various aspects of the present disclosure for disabling the receiver during a SID update cycle of the traffic frame pattern. Receiver enable signal RX_EN[1] 530-*a*-1 illustrates an aspect of the present disclosure where the receiver is disabled for every other traffic frame during the SID update cycle. Receiver enable signal RX_EN[2] 530-*a*-2 illustrates an aspect of the present disclosure where the receiver is disabled for two consecutive traffic frames during the SID update cycle. As illustrated by receiver enable signal RX_EN[2], the receiver may be enabled for the expected SID frame 514-*a*[*n*+1] according to the SID update cycle. Receiver enable signals RX_EN[3] 530-*a*-3 and RX_EN[4] 530-*a*-4 illustrate additional example aspects where the receiver is disabled for more than two traffic frames during the SID update cycle. Because voice frames at the beginning of speech bursts can occur at any time, the power savings of shutting off the receiver for a given number of consecutive traffic frames within each SID update cycle may be traded off against the possibility of missing a given number of voice frames at the beginning of the next speech burst.

Figure 5B:
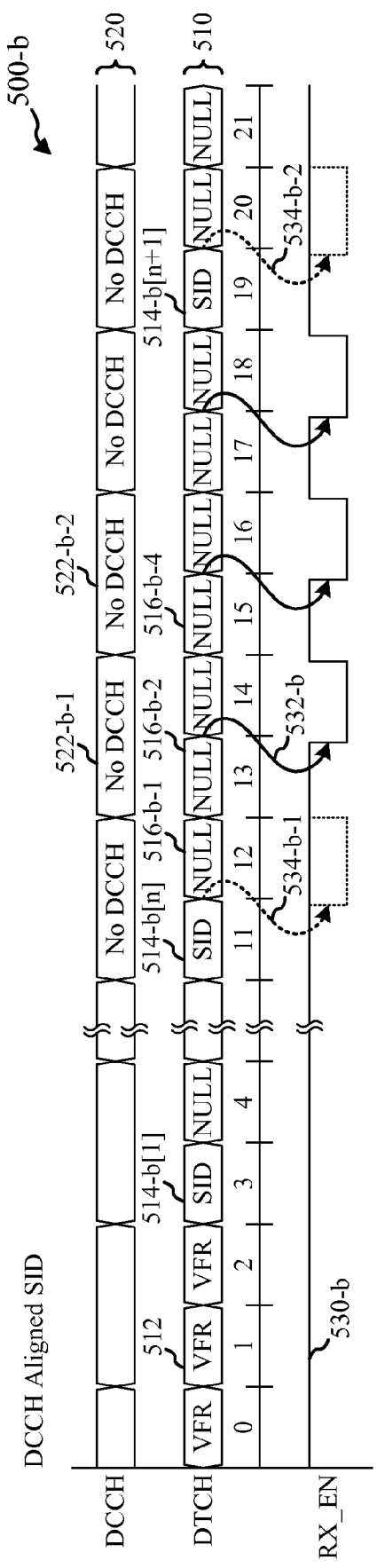
FIG. 5B shows a timing diagram that illustrates aspects of frame pattern assisted reduction in receiver power consumption in accordance with various aspects of the present disclosure.
Figure 5C:
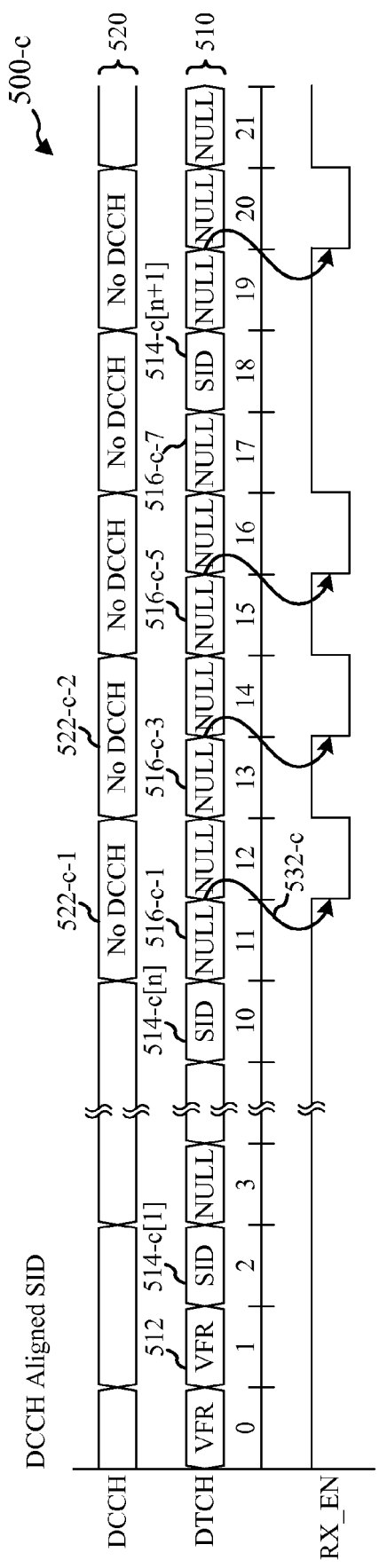
FIG. 5C shows a timing diagram that illustrates aspects of frame pattern assisted reduction in receiver power consumption in accordance in accordance with various aspects of the present disclosure.

In various aspects of the present disclosure, traffic frames for which the receiver is disabled may be aligned with frame timing for a control channel. FIGS. 5B and 5C illustrate such control channel aligned receiver disabling during non-speech periods in accordance with an aspect of the present disclosure. In timing diagrams 500-*b* and 500-*c* illustrated in FIGS. 5B and 5C, the control channel 520 has a frame period that is twice the frame period of the traffic channel 510. For example, the frame period of the traffic channel 510 may be 20 ms while the frame period for the control channel 520 may be 40 ms. In various instances, it may be possible to determine on a frame-by-frame basis if control information directed to the mobile device 115 is present in the control channel by decoding only a portion of each control channel frame. For example, information present in a beginning portion of the control channel frame (e.g., a device or subscriber identifier or the like) may indicate whether the control channel frame has information pertinent to the mobile device. In various aspects of the present disclosure, decoding of a portion equal to or less than the first half of each control channel frame is sufficient to determine if control information directed to the mobile device exists in the control channel frame.

In a further aspect, consistent with timing diagrams 500-*b* and 500-*c*, receiver disabling may be employed for traffic frames expected to be NULL frames that occur after a traffic frame aligned with the beginning of a control channel frame. Timing diagram 500-*b* may illustrate instances where SID update frames occur aligned with the beginning of each control channel frame. Based on receiving one or more SID frames 514-*b*, the decoder may detect the non-speech state and initiate receiver disabled after receiving SID update frame 514-*b*[*n*]. Following the SID update frame 514-*b*[*n*], the decoder on the receive side may look for a NULL frame 516-*b*-2 that is aligned with the beginning of a control channel frame. While receiving the NULL frame 516-*b*-2, the receiver may be concurrently determining whether control information related to the mobile device is present on the control channel 520. Based on receiving and decoding the control channel aligned NULL frame 516-*b*-2 (e.g., successful CRC check), and concurrently determining that no control information is present for the mobile device in control channel frame 522-*b*, the decoder may disable portions of the receiver for the following traffic frame (e.g., frame 14).

Furthermore, in an aspect, it may be possible to determine whether or not control information associated with the UE is present in control frame 522-*b*-1 before the end of frame 13. In these instances, arrow 532-*b* indicating when receiver disabling starts within control frame 522-*b*-1 is dependent on successful decode of NULL frame 516-*b*-2. However, frame early termination and/or NULL frame detection techniques described in more detail below may allow the start of the disable period indicated by arrow 532-*b* to occur prior to the end of frame 13.

As illustrated by the receiver enable signal RX_EN 530-*b* in timing diagram 500-*b*, the receiver may be re-enabled for frame 15. During frame 15, the decoder may decode NULL frame 516-*b*-4 while the control channel 520 is also scanned for information related to the mobile device. Based on successful decode of NULL frame 516-*b*-4, and determining that no control information related to the UE is present in control frame 522-*b*-2, the decoder may disable the receiver again during frame 16. The decoder may follow the pattern of disabling the receiver for each expected NULL frame not aligned with the beginning of a control channel frame until a voice frame is detected. In an example aspect of the present disclosure, the receiver is also disabled for traffic frames following the SID frames 514-*b* (e.g., frame 12, etc.) as indicated by dashed arrows 534-*b*-1 and 534-*b*-2.

The receiver may be disabled for more traffic frames during each SID update cycle of the traffic frame pattern during the non-speech state. For example, the receiver may be disabled for up to and including the number of expected NULL frames during the SID update period. According to the SID update cycle illustrated in FIG. 5B, the receiver may be disabled for up to seven frames in-between SID update frames. Portions of the receiver required for receiving control information may remain active during portions of the SID update cycle. For example, only those parts of the receiver that are unnecessary for control channel detection may be disabled for the SID update cycle while those portions used in receiving the control channel information may remain enabled. Disabling portions of the receiver related to receiving traffic frames for longer than one consecutive traffic frame may result in the loss of one or more voice frames at the start of a speech burst. However, in certain applications, the loss of these voice frames may be tolerable and/or outweighed by the savings in receiver power consumption.

In some instances of the present disclosure, SID frames within the non-speech state may not be aligned with control channel frames. For example, with a control channel frame period of twice the traffic channel period, SID frames may occur during the second half of a control channel frame instead of starting concurrently with control channel frames. As illustrated in timing diagram 500-*c* shown in FIG. 5C, similar techniques for disabling of portions of receiver subsystems based on SID frame patterns may still be used. In timing diagram 500-*c*, a sequence of SID frames (e.g., SID frame 514-*c*[1], 514-*c*[*n*], 514-*c*[*n*+1], etc.) during a non-speech period are not aligned with a start of control channel frames (e.g., DCCH frames 522-*c*, etc.). After detecting a traffic frame pattern of the non-speech state by detecting one or more SID frames 514-*c*, the receiver may be disabled for traffic frames following frames aligned with a control channel frame. For example, after receiving and decoding NULL frame 516-*c*-1, the receiver may be disabled for the following traffic frame (frame 12) as illustrated by arrow 532-*c*. The receiver may similarly be disabled for frames 14 and 16 based on receiving and successfully decoding NULL frames 516-*c*-3 and 516-*c*-5. The receiver may be enabled during frame 18 to receive the SID update frame 514-*c*[*n*+1]. In this way, the background noise information continues to be successfully updated.

In an example aspect, the receiver may be disabled during frame 18 based on successful decode of NULL frame 516-*c*-7. In such example aspects, background noise information for the SID update cycle beginning with SID update frame 514-*c*[*n*+1] may be lost. However, loss of background noise information for one or more SID update cycles may not create a perceptible change in received voice quality, in some instances.

Figure 5D:
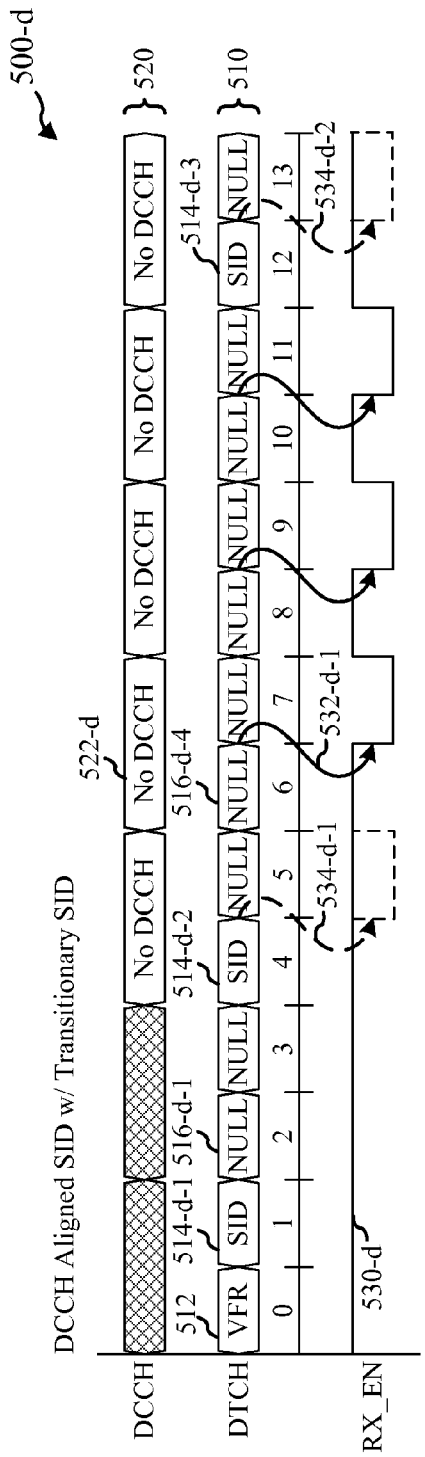
FIG. 5D shows a timing diagram that illustrates aspects of frame pattern assisted reduction in receiver power consumption in accordance in accordance with various aspects of the present disclosure.
Figure 5E:
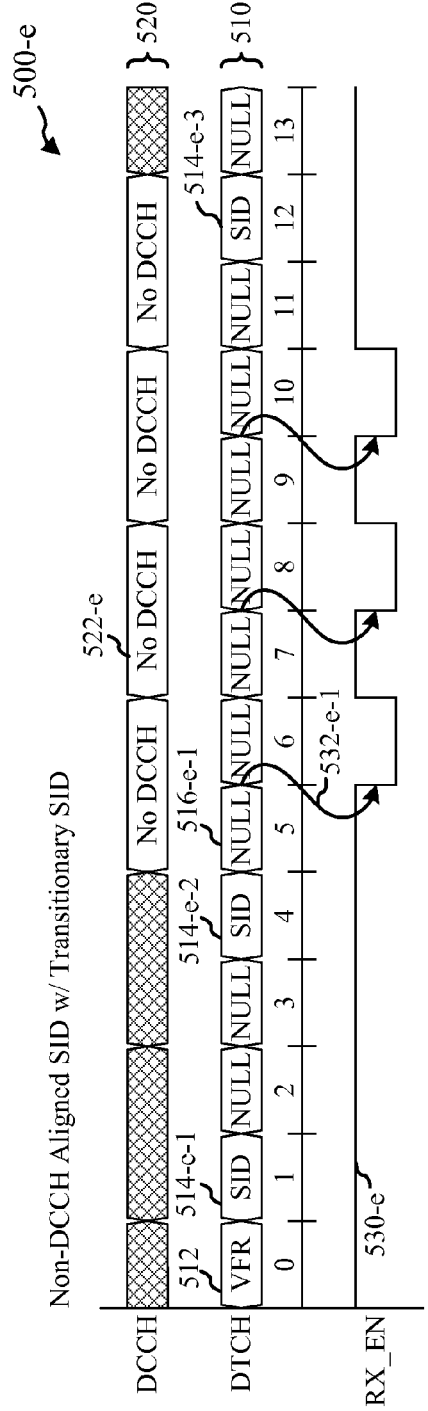
FIG. 5E shows a timing diagram that illustrates aspects of frame pattern assisted reduction in receiver power consumption in accordance with various.

As described above, some audio codecs may utilize a transitionary SID frame to indicate the beginning of a non-speech period between speech bursts. FIGS. 5D and 5E illustrate timing diagrams 500-*d* and 500-*e* that may illustrate techniques for receiver disabling employed in systems using these types of audio codecs, in accordance with various aspects of the present disclosure. In timing diagram 500-*d*, voice state pattern based receiver disabling is shown for instances where SID update frames 514-*d* are aligned with the beginning of control channel frames 522-*d*. In timing diagram 500-*d*, the transition to a non-speech period may be indicated by a transitionary SID frame 514-*d*-1 followed by one or more NULL frames (e.g., frame 516-*d*-1, etc.) and then SID update frame 514-*d*-2. After detection of SID update frame 514-*d*-2, the voice state based receiver disabling techniques described above may be employed to disable the receiver for traffic frames following NULL frames (e.g., 516-*d*-4) aligned with the beginning of control frames 522-*d* as indicated by arrow 532-*d*-1. In an example aspect, the receiver may also be disabled for traffic frames following SID update frames 514-*d*-2, 514-*d*-3, etc. as illustrated by arrows 534-*d*-1 and 534-*d*-2.

In timing diagram 500-*e* of FIG. 5E, voice state based receiver disabling is shown for instances where SID update frames 514-*e* occur offset to the beginning portion of each control channel frame during a non-speech period. Similarly to timing diagram 500-*d*, a non-speech state may be determined based on detecting the first SID update frame 514-*e*-2 after the transitionary SID frame 514-*e*-1. In the non-speech state, a NULL frame aligned with the beginning of a control channel frame may be detected (e.g., NULL frame 516-*e*-1, etc.) and the receiver may be disabled for the subsequent traffic frame as illustrated by arrow 532-*e*-1.

As described above with reference to FIG. 5A, one or more SID update cycles may be detected after the transitionary SID frame before employing the techniques for disabling the receiver following NULL frames within an SID frame update period, in some aspects of the present disclosure. In addition, it should be appreciated that disabling the receiver for more than one traffic frame in a row during an SID update cycle as illustrated in FIG. 5A may be employed with s illustrated in FIGS. 5B and 5C as well as FIGS. 5D and 5E.

Figure 5F:
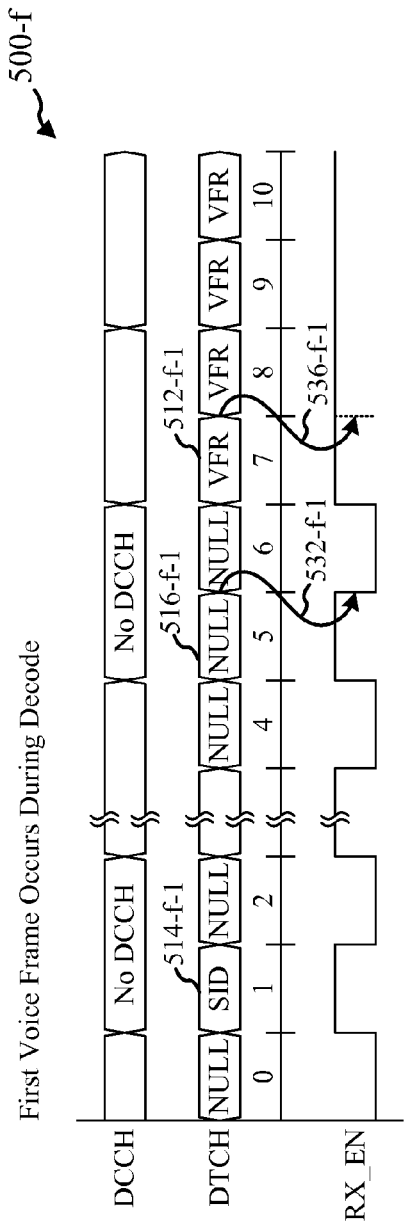
FIG. 5F shows a timing diagram that illustrates aspects of frame pattern assisted reduction in receiver power consumption in accordance with various aspects of the present disclosure.

As described above, a transition from a non-speech period to a speech burst may occur at any time. Turning next to FIG. 5F, a timing diagram 500-*f* showing a transition from a non-speech period to a speech burst is illustrated in accordance with various aspects of the present disclosure. In timing diagram 500-*f*, a first SID frame 514-*f*-1 followed by a number of NULL frames may occur during a period of non-speech. Using the receiver disabling techniques described above, the receiver may be disabled for frame 6 based on receiving a control channel aligned NULL frame 516-*f*-1 during a period of non-speech frames as illustrated by arrow 532-*f*-1. In timing diagram 500-*f*, a first voice frame 512-*f*-1 of the next speech burst occurs during a decoded frame. Based on decoding the voice frame 512-*f*-1, disabling the receiver for frames following NULL frames may be discontinued until a new non-speech period is detected, as illustrated by arrow 536-*f*-1.

Figure 5G:
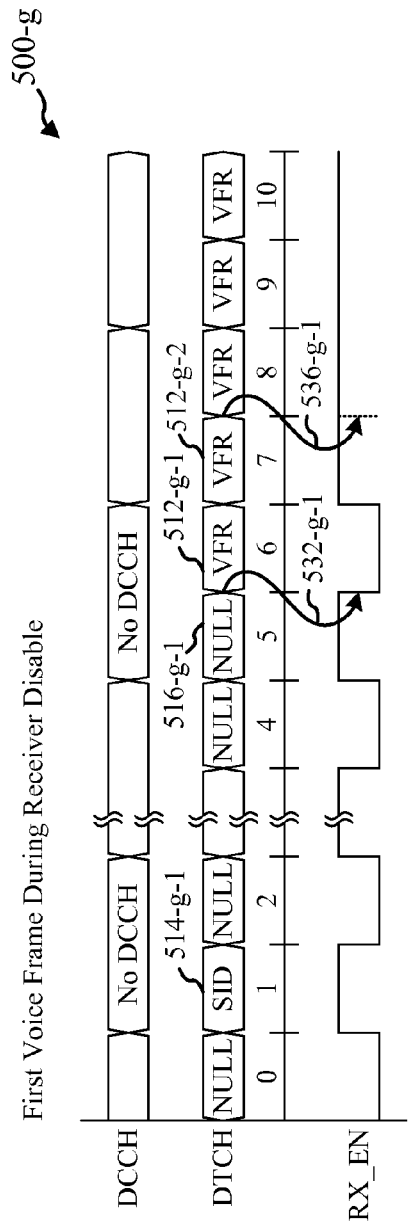
FIG. 5G shows a timing diagram that illustrates aspects of frame pattern assisted reduction in receiver power consumption in accordance with various aspects of the present disclosure.

Turning next to FIG. 5G, a timing diagram 500-*g* showing a transition from a non-speech period to a speech burst is illustrated in accordance with an aspect of the present disclosure. In timing diagram 500-*g*, a first SID frame 514-*g*-1 followed by a number of NULL frames may occur during a period of non-speech. Using the receiver disabling techniques described above, the receiver may be disabled for frame 6 based on receiving a control channel aligned NULL frame 516-*g*-1 during a period of non-speech frames as illustrated by arrow 532-*g*-1. A first voice frame 512-*g*-1 of the next speech burst may occur during a frame (e.g., frame 6) when the receiver is disabled. In this instance, because the receiver is disabled and the frame is not decoded, the voice frame 512-*g*-1 is not detected. However, the second voice frame 512-*g*-2 is decoded during frame 7 and disabling the receiver for frames following NULL frames may be discontinued until a new non-speech period is detected, as illustrated by arrow 536-*g*-1. Timing diagram 500-*g* illustrates that the maximum number of voice frames that may be lost at the beginning of a speech burst may be dependent on the number of consecutive traffic frames for which the receiver is disabled. Various s may disable the receiver for more traffic frames in a row, depending on the number of voice frames that can be lost at the beginning of speech bursts while maintaining a desired voice quality. In an example aspect, frame early termination may be used to reduce power consumption of the receiver further.

Figure 6:
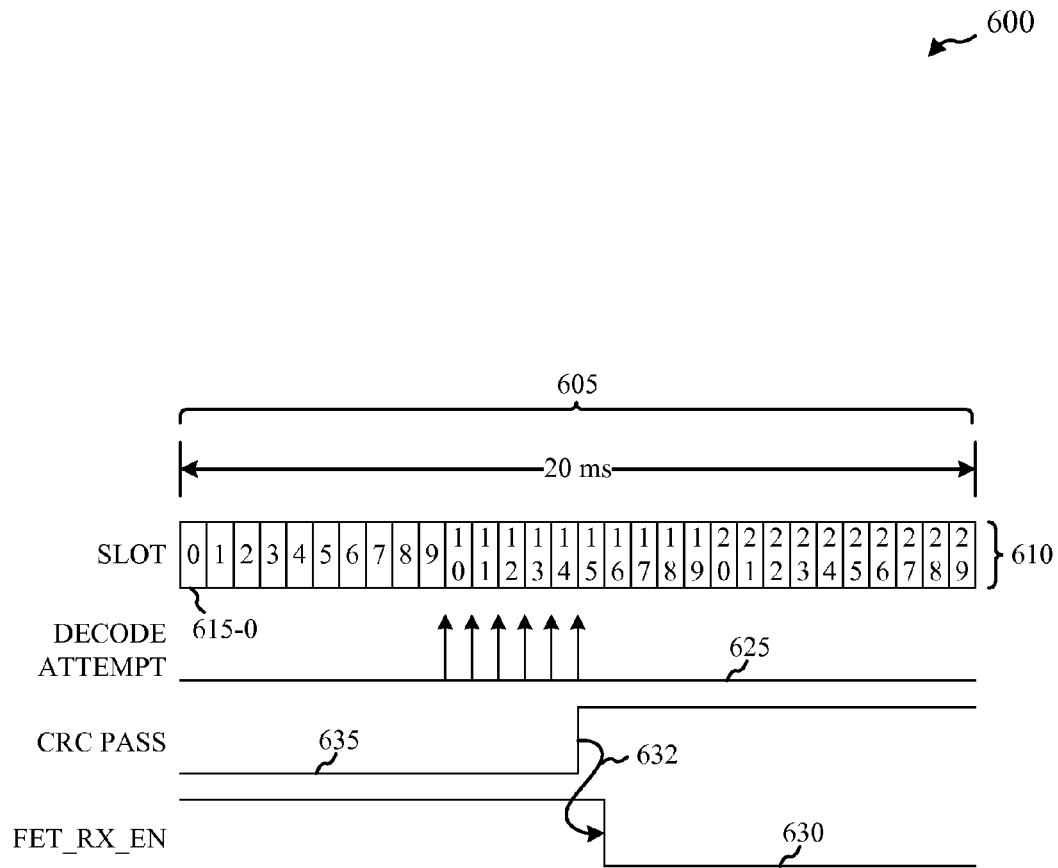
FIG. 6 shows a timing diagram that illustrates aspects of frame early termination in accordance with various aspects of the present disclosure.

FIG. 6 illustrates an aspect of frame early termination in timing diagram 600. Timing diagram 600 may illustrate a 20 ms UMTS voice frame 605 transmitted over a traffic channel 610. Voice frame 605 may include multiple slots (e.g., slot 615-0, etc.) within the 20 ms frame period. For example, a UMTS voice frame may include 30 slots within the 20 ms frame period. Closed-loop power control may be performed at a frequency corresponding to the duration of slots 615. The closed-loop power control may maintain an acceptable ratio of combined received energy per bit to effective noise power spectral density (Eb/Nt) for a given FER.

In an aspect, it may be possible for frame 605 to be successfully decoded prior to receiving all slots of the frame because of redundancy in coding of frame 605. For example, in an aspect, frame decode is attempted at various times within frame 605. Frame decode attempt signal 625 indicates that the frame decoder may attempt decode after only a portion of the slots 615 of the frame 605 have been received, for example, after the tenth slot is received. However, in the example illustrated in timing diagram 600, CRC may fail on this attempt. Decode of the frame is attempted after subsequent slots until, after receiving 15 slots of frame 605, CRC for the frame 605 passes as indicated by CRC_PASS signal 635. Once CRC has passed for the frame 605, further decode attempts may be discontinued. As indicated by the transition of signal FET_RX_EN 630 at arrow 632, various components of receiver subsystem may be disabled or gated off for the rest of the frame 605 based on successful decode of the frame before all slots are received.

Power control may be used in conjunction with frame early termination to increase the likelihood of correctly decoding traffic frames before receiving all slots. For example, the UE 115 may indicate to the base station 105 that the transmit power (e.g., outer-loop power control) should be increased even when the mobile device is receiving voice communications at a predetermined FER (e.g., 1%, etc.). The UE may, for example, indicate to the base station 105 that the outer-loop power control should be increased to provide the predetermined FER with fewer than all slots of a traffic frame. The UE can, using this technique, reduce the amount of power required to receive the voice communications.

Referring to FIG. 7A, timing diagram 700-a illustrates receiver power reduction using frame pattern based receiver disabling techniques in combination with frame early termination techniques in accordance with various aspects of the disclosure. In timing diagram 700-a, transmit power may be increased to result in an enhanced success rate for passing CRC before receiving all slots of traffic frames. For example, transmit power may be increased to provide approximately 100% success for decoding traffic frames after 10 ms (e.g., after receiving 15 of 30 slots of a traffic frame). Signal RX_EN 730 indicates that frame early termination may be used to disable the receiver during portions of each traffic frame after CRC passes. Frame early termination may result, in the example of timing diagram 700-a, in disabling of portions of the receiver for approximately 45% of each frame period.

As illustrated in timing diagram 700-a, frame pattern based receiver disabling techniques may be used to disable the receiver for certain traffic frames as described above. For example, a transition to a period without active speech may be indicated by SID frame 714-a-1 followed by one or more NULL frames 716-a. In the non-speech state, a pattern of SID update frames 714-a-2, 714-a-3 may be transmitted followed by a number of NULL frames 716-a. After a control channel aligned NULL frame 716-a-2 is detected in the non-speech state, the receiver may be disabled for the next traffic frame (e.g., frame 7). Thus, the receiver may be disabled during portions of each traffic frame using frame early termination techniques, and in addition the receiver may be disabled for certain traffic frames using the described voice state pattern based receiver disabling techniques. Using the described combination of techniques, the receiver may be disabled for approximately 65% of the time during periods when voice frames are not transmitted. In an example aspect, a range of power control adjustments may be made to provide for various amounts of power savings in the receiver of the mobile device. For example, the transmitter power control may be adjusted based on various factors such as interference to other mobile devices, etc.

Referring to FIG. 7B, timing diagram 700-b illustrates another example of receiver power reduction using frame pattern assisted techniques in combination with frame early termination techniques in accordance with various aspects of the present disclosure. In timing diagram 700-b, transmitter power control may be adjusted to provide for approximately a 50% success rate for decoding voice frames after receiving half of the slots in the frame (e.g., 15 of 30 slots, etc.). The success rate may be higher for traffic frames other than voice frames. For example, SID frames and/or NULL frames may have less information content than voice frames. In some instances, these frames may have a higher success rate for decoding based on a subset of data in the frame. For example, SID frames may be correctly decoded earlier, on average, than voice frames, and NULL frames may be correctly decoded earlier, on average, than SID frames. For example, in timing diagram 700-b, voice frame 712-b is decoded, for example, after approximately 75% of the slots in the voice frame 712-b have been received. This may result in disabling of the receiver for time period A. SID frames 714-b may be decoded, for example, after approximately 65% of the slots have been received while NULL frames 716-b may be decoded after approximately 50% of the slots have been received. Thus, the receiver may be disabled, on average, for a time period B for SID frames 714-b and a time period C for NULL frames 716-b.

In an aspect, frame early termination techniques may be used in some instances without increasing transmit power. For example, there may be a high probability that NULL frames can be decoded prior to receipt of all slots of the frame even without increasing transmitter power. Thus, frame early termination may be used to turn off the receiver during portions of at least these frames during periods where active speech is not present.

As described above, the point at which the receiver may be turned off for a frame may depend on both detection of control information on the control channel and detection of the type of traffic frame. For example, during frame 6 of timing diagram 700-b decode may be attempted for control frame 722-b on the control channel 520 and NULL frame 716-b on the traffic channel 510 concurrently. The time at which the RX_EN signal 730 may transition to a low state to disable the receiver during frame 6 may be determined by the later occurring of correctly decoding the NULL frame 716-b on the traffic channel 510 and determining that no control information is present within control channel frame 722-b. In a further aspect, NULL frame detection may be used to provide benefits associated with frame pattern based receiver disabling while reducing the probability of loss of voice frames at transitions between the non-speech state and speech bursts.

Figure 8A:
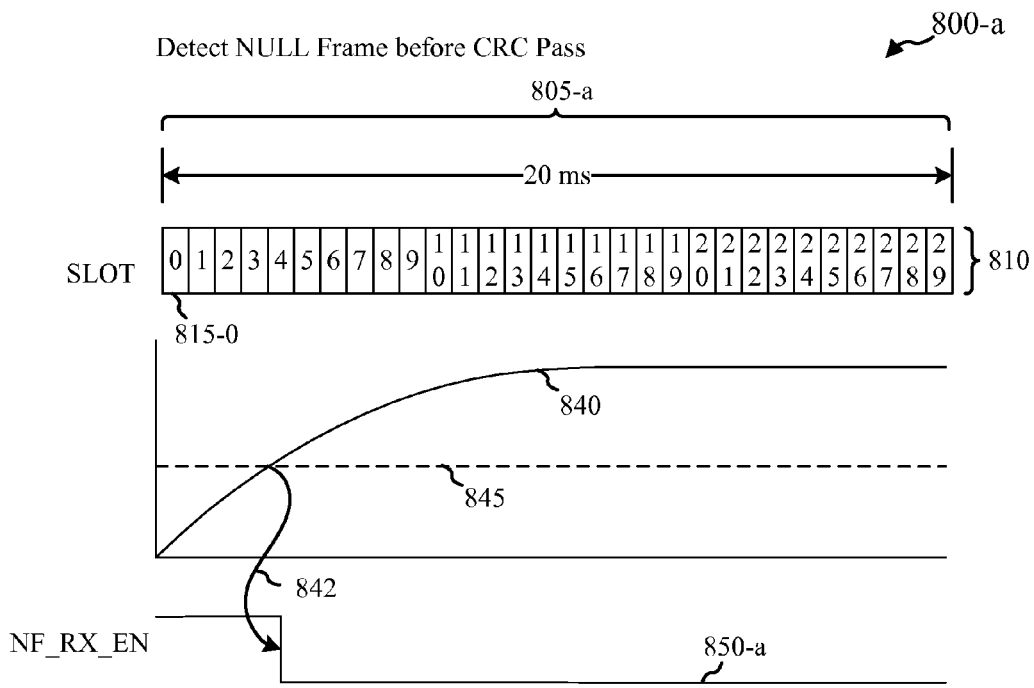
FIG. 8A shows a timing diagram that illustrates aspects of NULL frame detection in accordance with various aspects of the present disclosure.

Referring to FIG. 8A, aspects of NULL frame detection are illustrated in timing diagram 800-*a* in various aspects of the present disclosure. Timing diagram 800-*a* may illustrate a 20 ms UMTS voice frame 805 transmitted over a traffic channel 810. Voice frame 805 may include multiple slots (e.g., slot 815-0, etc.) within the 20 ms frame period. For example, a UMTS voice frame may include 30 slots within the 20 ms frame period. Closed-loop power control may be performed at a frequency corresponding to the duration of slots 815.

As illustrated in timing diagram 800-*a*, a probability estimate 840 that traffic frame 805 is a NULL frame may be determined based on the received slots 815 even before CRC passes for the traffic frame. For example, the probability estimate 840 may be based on a probability calculation (e.g., hamming distance, etc.) that the received data matches the expected NULL frame data. In an example aspect, the probability estimate 840 may be compared with a NULL frame confidence threshold 845 to provide a NULL frame detection signal NF_RX_EN 850-*a*. For example, in traffic frame 805, the probability estimate 840 may equal or exceed the NULL frame confidence threshold 845 after the receipt of the fourth slot 815. The NF_RX_EN signal 850-*a* may then transition as indicated by arrow 842. The transition indicated by arrow 842 for NF_RX_EN signal 850-*a* may be used by the device to disable the receiver for the rest of a frame that is expected to be a NULL frame. In an aspect, frame assisted receiver disabling, NULL frame detection may be employed in combination with frame early termination.

Figure 8B:
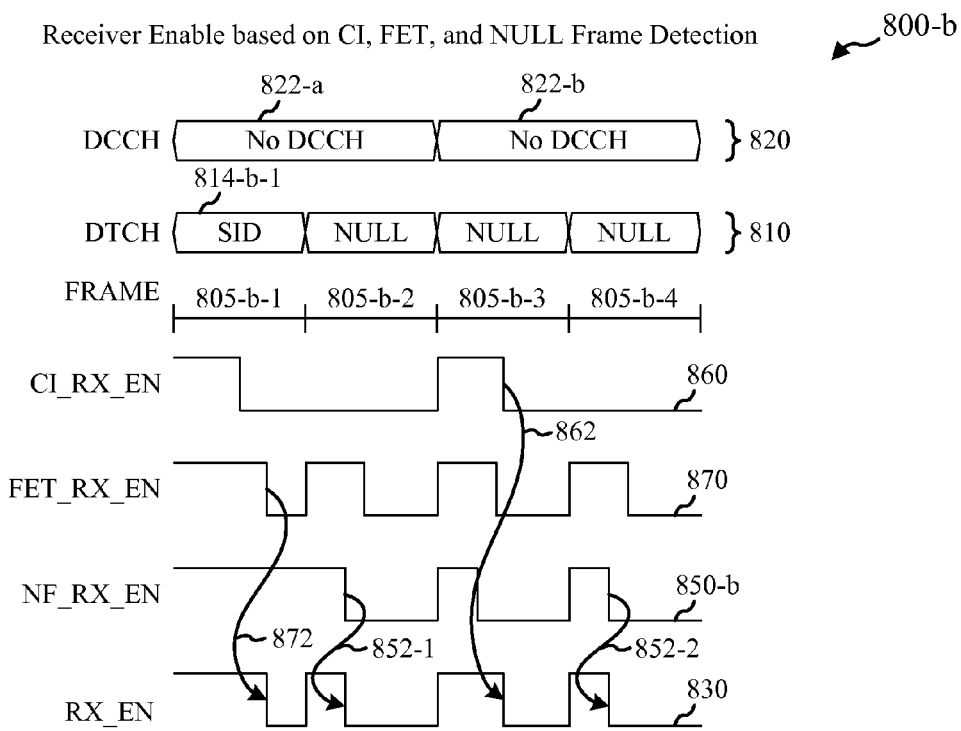
FIG. 8B shows a timing diagram that illustrates aspects of reducing power consumption using a combination of frame pattern assisted receiver disabling, control channel information detection, frame early termination, and NULL frame detection in accordance with various aspects of the present disclosure.

Referring to FIG. 8B, frame assisted receiver disabling employing a combination of NULL frame detection and frame early termination is illustrated, in accordance with various aspects of the present disclosure. In timing diagram 800-*b*, a first traffic frame 805-*b*-1 may include a SID update frame 814-*b*-1 during a non-speech period on the traffic channel 810. The first traffic frame 805-*b*-1 may be aligned with the beginning of a control channel frame 822-*a* on a control channel 820. The UE may expect the first traffic frame 805-*b*-1 to be a SID update frame based on the SID update cycle. Therefore, during frame 805-*b*-1, receiver disabling may depend on whether control information is present in control channel frame 822-*a*, and whether the SID update frame 814-*b*-1 is received correctly (e.g., CRC pass, etc.). In this instance, no control information is present in control frame 822-*a*, as illustrated by the transition of CI_RX_EN signal 860 during control frame 805-*b*-1. In this case, the receiver may be disabled when SID update frame 814-*b*-1 is received, as illustrated by arrow 872 showing that CRC pass of SID update frame 814-*b*-1 as indicated by signal FET_RX_EN 870 may cause a transition on receiver disable signal RX_EN 830.

During traffic frame 805-*b*-2, the UE may expect a NULL frame. Because it has already been determined that no control information is present in control frame 822-*a*, receiver disabling for traffic frame 805-*b*-2 may depend on NULL frame detection signal NF_RX_EN 850-*b*. As illustrated in timing diagram 800-*b* by arrow 852-1, when NF_RX_EN signal 850-*b* indicates that a NULL frame has been detected (e.g., a NULL frame confidence threshold has been exceeded, etc.), the receiver may be disabled for the remainder of traffic frame 805-*b*-2. The receiver may be disabled even before CRC passes for traffic frame 805-*b*-2, as indicated by arrow 852-1 occurring earlier in traffic frame 805-*b*-2 than the transition of FET_RX_EN signal 870 that indicates a CRC pass for traffic frame 805-*b*-2.

During traffic frame 805-*b*-3, the UE may again expect a NULL frame based on voice state pattern detection. However, because traffic frame 805-*b*-3 is aligned with a new control channel frame 822-*b*, receiver disabling may depend on the later occurring of NULL frame detection and determination of whether control information is present in control frame 822-*b*. As illustrated by arrow 862, receiver disabling for traffic frame 805-*b*-3 may be dependent on a determination that no control information is present for the UE in control channel frame 822-*b*. Similarly to traffic frame 805-*b*-2, receiver disabling during traffic frame 805-*b*-4 may be dependent on NULL frame detection as illustrated by arrow 852-2.

Figure 9A:
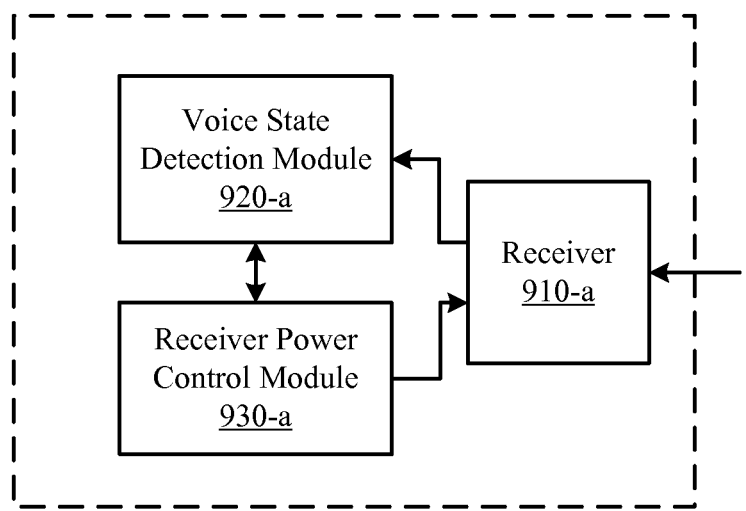
FIG. 9A shows a block diagram of a device configured to reduce power consumption of received voice communications using voice state assisted receiver disabling in accordance with various aspects of the present disclosure.

Referring to FIG. 9A, illustrated is device 900-*a* which may be, for example, UE 115 described in reference to FIGS. 1 and 2. In an aspect, device 900-*a* may be a processor. In an aspect, device 900-*a* may include a voice state detection module 920-*a* and/or a receiver power control module 930-*a*. In an additional aspect, the components of 900-*a* may communicate with each other and/or may be configured to receive voice communications from other devices such as UEs 115 and/or base stations 105.

In an aspect, device 900-*a* may be configured to reduce power consumption for received voice communications by disabling components of the receiver subsystem for certain traffic frames based on recognized frame patterns. A non-speech state between speech bursts may be detected by voice state detection module 920-*a* based on voice state patterns including SID frames and/or NULL frames as described above. The non-speech state may include a repeated pattern of SID update frames followed by a number of NULL frames. In an aspect, voice state detection module 920-*a* may detect frame patterns based on SID frames to determine a likelihood of a next traffic frame being a NULL frame. In an additional aspect, receiver power control module 930-*a* reduces power consumption of receiver 910-*a* by disabling components of receiver 910-*a* for certain traffic frames during the non-speech state. In an example aspect, components of the receiver 910-*a* may be disabled for traffic frames following a NULL frame aligned with the beginning of a control channel frame in the non-speech state. In additional example aspect, receiver 910-*a* may be disabled for more than one consecutive traffic frames. For example, the receiver may be disabled for most or even all traffic frames between SID update frames during the non-speech state.

Figure 9B:
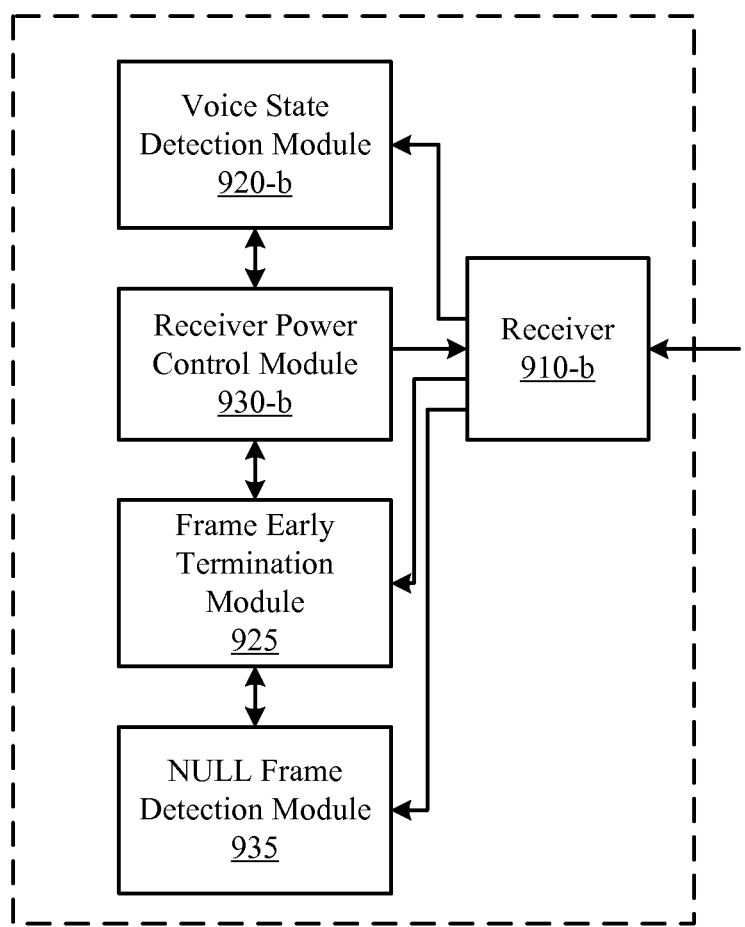
FIG. 9B shows a block diagram of a device configured to reduce power consumption of received voice communications using voice state assisted receiver disabling in accordance with various aspects of the present disclosure.

Referring to FIG. 9B, illustrated is device 900-*b* which may be, for example, UE 115 described in reference to FIGS. 1 and 2. In an aspect, the device 900-*b* may be a processor. In an aspect, device 900-*b* may include a receiver module 910-*b*, voice state detection module 920-*b*, a receiver power control module 930-*a*, frame early termination module 925, and/or NULL frame detection module 935. Each of these components may communicate with each other. In an additional aspect, the components of 900-*b* may communicate with each other and/or may be configured to receive voice communications from other devices such as UEs 115 and/or base stations 105.

In an aspect, device 900-*b* may be configured to reduce power consumption for received voice communications by disabling subsystems of receiver 910-*b* for certain traffic frames based on voice state patterns. For example, device 900-*b* may be configured to combine voice state pattern based receiver disabling with frame early termination and NULL frame detection to disable subsystems or components of receiver 910-*b* for subsets or portions of traffic frames as described above with reference to FIGS. 6, 7A, 7B, and/or 8B. For example, certain frames may be correctly decoded (e.g., a cyclic redundancy check (CRC) for the frame may pass, indicating that the encoded data for the frame has been correctly received) before each slot of a traffic frame is received. In an aspect, outer loop power control for the downlink may be adjusted to increase the likelihood of early CRC pass. NULL frame detection may be used to detect expected NULL frames, based on recognized voice state patterns, even before CRC pass.

In an aspect, receiver power control module 930-b may disable portions or components of receiver subsystem or receiver 910-b for portions of traffic frames based on signals received from frame early termination module 925, voice state detection module 920-b, and/or NULL frame detection module 935. For example, voice state detection module 920-b may detect voice state patterns based on SID frames to determine a likelihood of a next traffic frame being a NULL frame. Receiver power control module 930-b may use information from voice state detection module 920-b, in combination with information from frame early termination module 925 and/or NULL frame detection module 935 to disable the receiver for certain portions of traffic frames as described above.

Components of devices 900-a and/or 900-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In an aspect, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 10A:
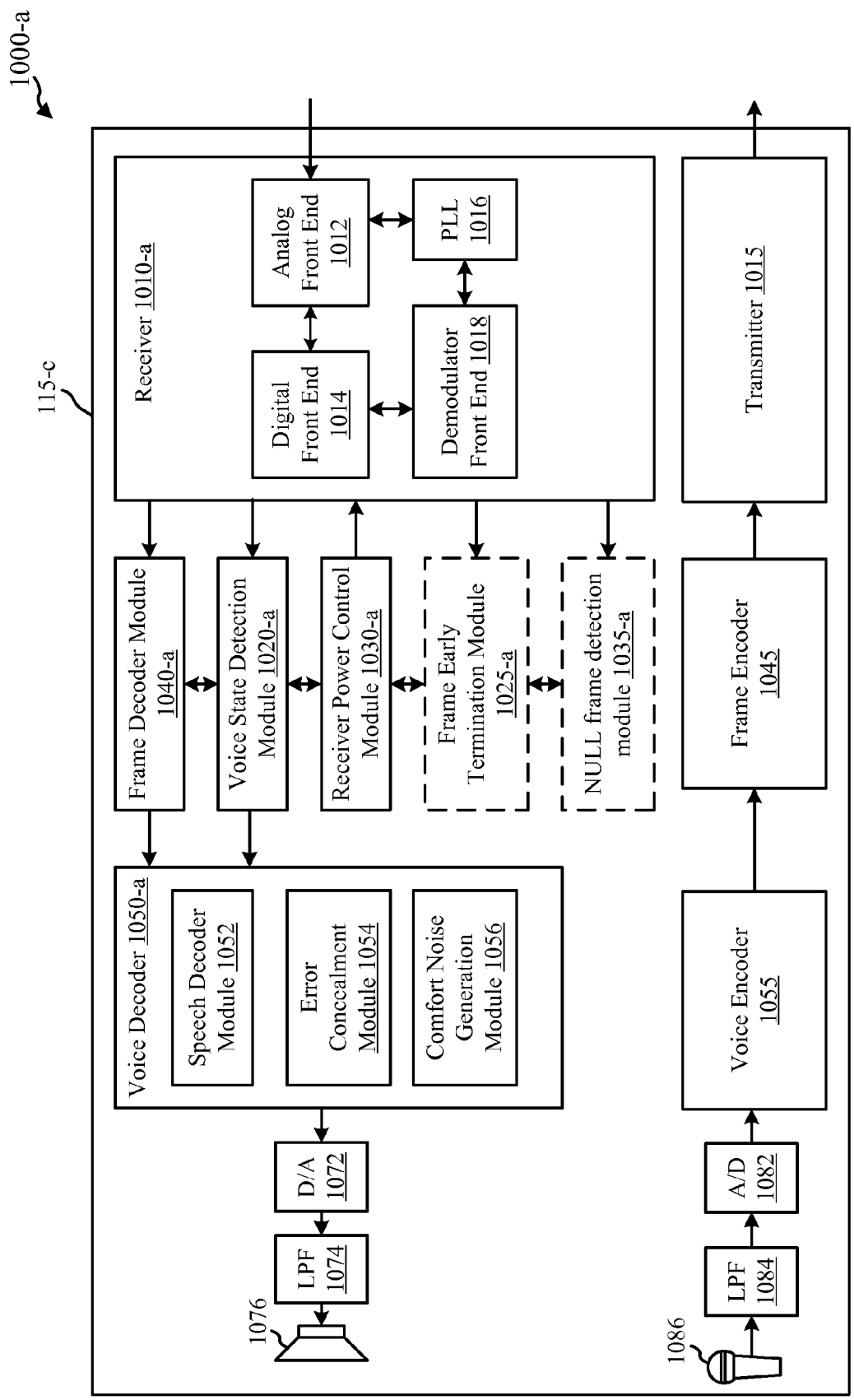
FIG. 10A shows a block diagram of a user equipment configured to reduce power consumption of received voice communications in accordance with various aspects of the present disclosure.

FIG. 10A illustrates a block diagram 1000-a of UE 115-c configured for receiving voice communications in accordance with various aspects of the present disclosure. The UE 115-c may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-c may have an internal power supply (not shown), such as a small battery, to facilitate mobile operation. In some s, the UE 115-c may be UEs 115 of FIG. 1 and/or FIG. 2.

In an aspect, the UE 115-c may generally include components for bi-directional voice communications including components for transmitting voice communications and components for receiving voice communications. Components for transmitting voice communications may include microphone 1086, LPF 1084, A/D converter 1082, voice encoder 1055, frame encoder 1045, and/or transmitter 1015. Components for receiving voice communications may include receiver module 1010-a, frame decoder module 1040-a, voice state detection module 1020-a, receiver power control module 1030-a, a frame early termination module 1025-a, a NULL frame detection module 1035-a, a voice decoder module 1050-a, D/A converter 1072, LPF 1074, and/or speaker 1076. Voice decoder module 1050-a may have various components for processing received voice frames including speech decoder 1052, error concealment module 1054, and/or comfort noise generation module 1056. Receiver module 1010-a may have various subsystems including analog front end 1012, digital front end 1014, PLL 1016, and/or demodulator front end 1018.

In an aspect, UE 115-c may be configured to reduce power consumption for received voice communications by disabling receiver subsystems for certain traffic frames based on recognized voice state patterns. A non-speech state between speech bursts may be detected by voice state detection module 1020-a based on voice state patterns including SID frames and/or NULL frames. The non-speech state may include a repeated pattern of SID update frames followed by a number of NULL frames. In an aspect, voice state patterns may be detected based on SID frames to determine a likelihood of a next traffic frame being a NULL frame. In an additional aspect, power consumption of receiver components is reduced by disabling components of the receiver for certain traffic frames during the non-speech state. For example, the receiver for traffic frames is disabled following a NULL frame aligned with the beginning of a control channel frame in the non-speech state. In an additional example, the receiver is disabled for more than one consecutive traffic frame. Additionally, in an aspect, the receiver may be disabled for most or even all traffic frames between SID update frames during the non-speech state.

In an aspect, voice state detection module 1020-a may detect voice state patterns and indicate to receiver power control module 1030-a that the receiver may be disabled for certain traffic frames. Receiver power control module 1030-a may disable one or more subsystems of receiver 1010-a for the indicated traffic frame. For example, receiver power control module 1030-a may disable (e.g., turn off or gate, etc.) one or more of analog front end 1012, digital front end 1014, PLL 1016, demodulator front end 1018, and/or other subsystems of receiver 1010-a for traffic frames or portions of traffic frames.

In an aspect, frame decoder module 1040-a and/or voice state detection module 1020-a provide frame type and frame quality indicators to voice decoder 1050-a. However, for traffic frames where receiver 1010-a is disabled for the entire traffic frame or portions thereof according to an example aspect described above, frame decoder module 1040-a may not receive sufficient traffic frame data to generate a traffic frame for passing to voice decoder 1050-a. However, frame decoder module 1040-a may nonetheless indicate a frame type (e.g., NULL frame) and a frame quality indicator (e.g., GOOD) that indicates successful receipt of the traffic frame to the voice decoder 1050-a for a traffic frame for which limited or no frame data is received by the frame decoder 1040-a. In this instance, the voice decoder 1050-a may generate comfort noise according to the most recent SID update frame without recognizing that receipt of the traffic frame has been skipped due to the receiver disabling techniques.

In an aspect, system 1000-a may include a frame early termination module 1025-a for disabling subsystems of receiver 1010-a for portions of traffic frames. In an example aspect, certain frames may be correctly decoded (e.g., a cyclic redundancy check (CRC) for the frame may pass, indicating that the encoded data for the frame has been correctly received) before each slot of a traffic frame is received. Additionally, in an aspect, outer loop power control for the downlink may be adjusted to increase the likelihood of early CRC pass. Frame early termination module 1025-a may indicate to receiver power control module 1030-a that the receiver 1010-a may be disabled during portions of various traffic frames based on the early CRC pass for the frame. In an aspect, disabling of the receiver 1010-*a* based on voice state patterns may be combined with frame early termination within traffic frames.

In an aspect, system 1000-*a* may include a NULL frame detection module 1035-*a* for detecting NULL frames prior to CRC pass of traffic frames. For example, NULL frame detection module 1035-*a* may detect NULL frames based on a probability estimate and indicate to receiver power control module 1030-*a* that a NULL frame has been detected. Additionally, in an aspect, NULL frame detection may be combined with frame early termination and/or voice state pattern receiver disabling.

Figure 10B:
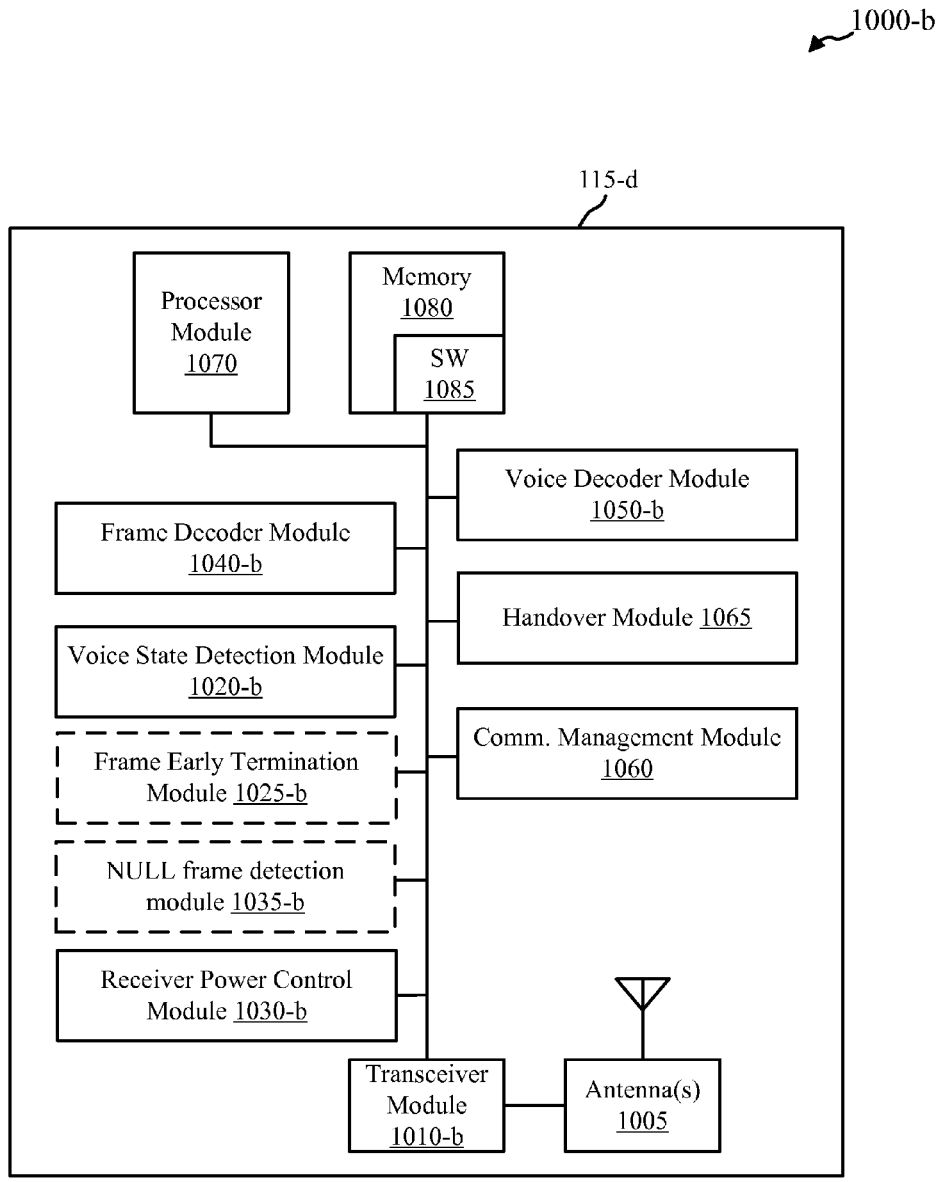
FIG. 10B shows a block diagram of a user equipment configured to reduce power consumption of received voice communications in accordance with various aspects of the present disclosure.

FIG. 10B illustrates a block diagram 1000-*b* of a UE 115-*d* that may be configured for receiving voice communications. UE 115-*d* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-*d* may have an internal power supply (not shown), such as a small battery, to facilitate mobile operation. In some s, the UE 115-*d* may be the UE 115 of FIG. 1 and/or FIG. 2.

The UE 115-*d* may include a transceiver module 1010-*b*, voice state detection module 1020-*b*, receiver power control module 1030-*b*, antenna(s) 1005, memory 1080, and a processor module 1070, which each may communicate, directly or indirectly, with each other (e.g., via one or more buses). The transceiver module 1010-*b* is configured to communicate bi-directionally, via the antenna(s) 1005 and/or one or more wired or wireless links, with one or more networks, as described above. For example, the transceiver module 1010-*b* may be configured to communicate bi-directionally with base stations 105 of FIG. 1 and/or FIG. 2. The transceiver module 1010-*b* may include a modem configured to modulate the packets and provide the modulated packets to the antenna(s) 1005 for transmission, and to demodulate packets received from the antenna(s) 1005. While the mobile device 115-*d* may include a single antenna 1005, the mobile device 115-*d* may have multiple antennas 1005 capable of concurrently transmitting and/or receiving multiple wireless transmissions.

The memory 1080 may include random access memory (RAM) and read-only memory (ROM). The memory 1080 may store computer-readable, computer-executable software/firmware code 1085 containing instructions that are configured to, when executed, cause the processor module 1070 to perform various functions described herein (e.g., call processing, database management, message routing, etc.). Alternatively, the software/firmware code 1085 may not be directly executable by the processor module 1070 but be configured to cause a computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc. The UE 115-*d* may include a speech encoder (not shown) configured to receive audio via a microphone, convert the audio into packets (e.g., 20 ms in length, 30 ms in length, etc.) representative of the received audio, provide the audio packets to the transceiver module 1010, and provide indications of whether a user is speaking. Alternatively, the voice encoder may only provide packets to the transceiver module 1010-*b*, with the provision or withholding/suppression of the packet itself providing the indication of whether a user is speaking. The speech encoder may be implemented in a separate module or the functions of the speech encoder may be performed by processor 1070.

UE 115-*d* may include a frame decoder module 1040-*b* for decoding voice frames. Alternatively, the functions of frame decoder module 1040-*b* may be performed by processor 1070. Similarly, UE 115-*d* may have a separate voice decoder module 1050-*b*, or these functions may be implemented in processor 1070.

According to the architecture of FIG. 10B, UE 115-*d* may further include a communications management module 1060. The communications management module 1060 may manage communications with other UEs 115. By way of example, the communications management module 1060 may be a component of UE 115-*d* in communication with some or all of the other components of UE 115-*d* via a bus. Alternatively, functionality of the communications management module 1060 may be implemented as a component of the transceiver module 1010-*b*, as a computer program product, and/or as one or more controller elements of the processor module 1070.

The components for UE 115-*d* may be configured to implement aspects discussed above with respect to UE 115-*c* illustrated in FIG. 10A and/or devices 900-*a* and/or 900-*b* of FIG. 9A and FIG. 9B and may not be repeated here for the sake of brevity. For example, the voice state detection module 1020-*b* may include similar functionality as voice state detection modules 920-*a*, 920-*b*, and/or 1020-*a*, the frame early termination module 1025-*b* may include similar functionality as frame early termination modules 925 and/or 1025-*a*, the NULL frame detection module 1035-*b* may include similar functionality as NULL frame detection module 1035-*a*, and receiver power control module 1030-*b* may include similar functionality as receiver power control modules 930-*a*, 930-*b*, and/or 1030-*a*.

In an aspect, a handover module 1065 may be utilized to perform handover procedures of UE 115-*d* from one base station to another. For example, the handover module 1065 may perform a handover procedure of UE 115-*d* from one base station to another where voice communications are being received from the base stations.

Figure 11:
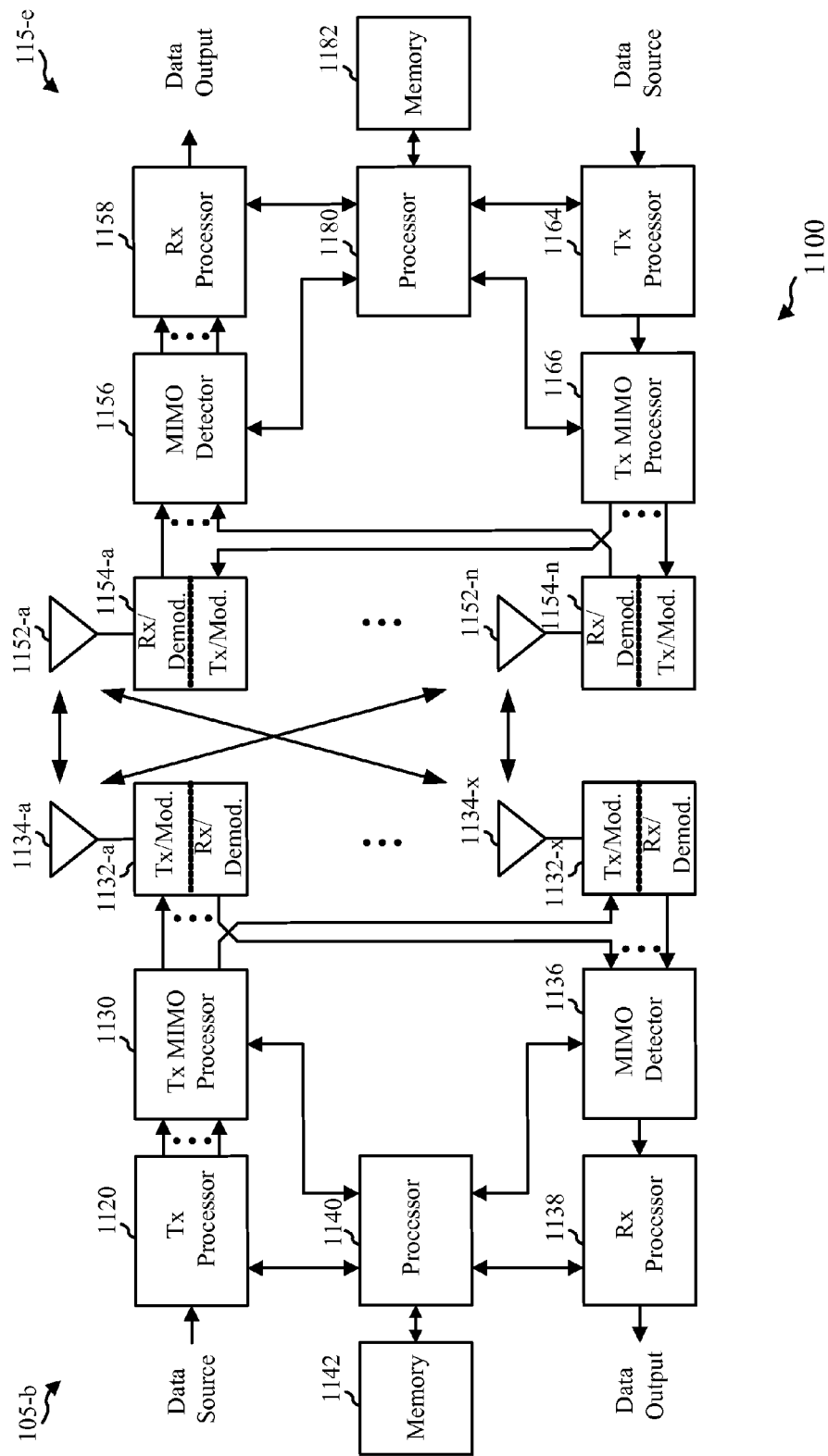
FIG. 11 shows a block diagram of a wireless communications system that includes a base station and a mobile device in accordance with various aspects of the present disclosure.

FIG. 11 illustrates a block diagram of a system 1100 including a base station 105-*b* and UE 115-*e* according to an aspect of the disclosure. System 1100 may be an example of the system 100 of FIG. 1 and/or system 200 of FIG. 2. The base station 105-*b* may be equipped with antennas 1134-*a* through 1134-*x*, and UE 115-*e* may be equipped with antennas 1152-*a* through 1152-*n*. At the base station 105-*b*, a transmit processor 1120 may receive data from a data source.

The transmitter processor 1120 may process the data. The transmitter processor 1120 may also generate reference symbols, and a cell-specific reference signal. A transmit (TX) MIMO processor 1130 may perform spatial processing (e.g., pre-coding) on data symbols, control symbols, and/or reference symbols, if applicable, and may provide output symbol streams to the transmit modulators 1132-*a* through 1132-*x*. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-*a* through 1132-*x* may be transmitted via the antennas 1134-*a* through 1134-*x*, respectively. The transmitter processor 1120 may receive information from a processor 1140. The processor 1140 may be configured to generate voice frames and process the voice frames in accordance with the voice encoding techniques described above. In an aspect, the processor 1140 may be implemented as part of a general processor, the transmitter processor 1120, and/or the receiver processor 1138. A memory 1142 may be coupled with the processor 1140.

At UE 115-g, the UE antennas 1152-a through 1152-n may receive the DL signals from the base station 105-e and may provide the received signals to the demodulators 1154-a through 1154-n, respectively. Each demodulator 1154 may condition (e.g., filter, amplify, down convert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-a through 1154-n, perform MIMO detection on the received symbols if applicable, and provide detected symbols. A receiver processor 1158 may process (e.g., demodulate, de-interleave, and decode) the detected symbols, providing decoded data for the mobile device 115-g to a data output, and provide decoded control information to a processor 1180, or memory 1182.

On the uplink (UL), at UE 115-g, a transmitter processor 1164 may receive and process data from a data source. The transmitter processor 1164 may also generate reference symbols for a reference signal. The symbols from the transmitter processor 1164 may be pre-coded by a transmit MIMO processor 1166, if applicable, further processed by the demodulators 1154-a through 1154-n (e.g., for SC-FDMA, etc.), and be transmitted to the base station 105-e in accordance with the transmission parameters received from the base station 105-e. At the base station 105-e, the UL signals from UE 115-g may be received by the antennas 1134, processed by the demodulators 1132, detected by a MIMO detector 1136 if applicable, and further processed by a receiver processor. The receiver processor 1138 may provide decoded data to a data output and to the processor 1180. In an aspect, the processor 1180 may be implemented as part of a general processor, the transmitter processor 1164, and/or the receiver processor 1158.

In an aspect, the processor 1180 is configured to reduce power consumption in voice communications by disabling portions of receiver components of the mobile device using the voice state patterns, frame early termination, and/or NULL frame detection techniques described above. For example, processor 1180 may detect non-speech periods based on voice frame patterns such as SID frames as described in detail above. Using these techniques, processor 1180 may disable portions of antennas 1152-a through 1152-n, demodulators 1154-a through 1154-n, MIMO detector 1156 and/or receiver processor 1158 based on the detected voice frame patterns.

Figure 12:
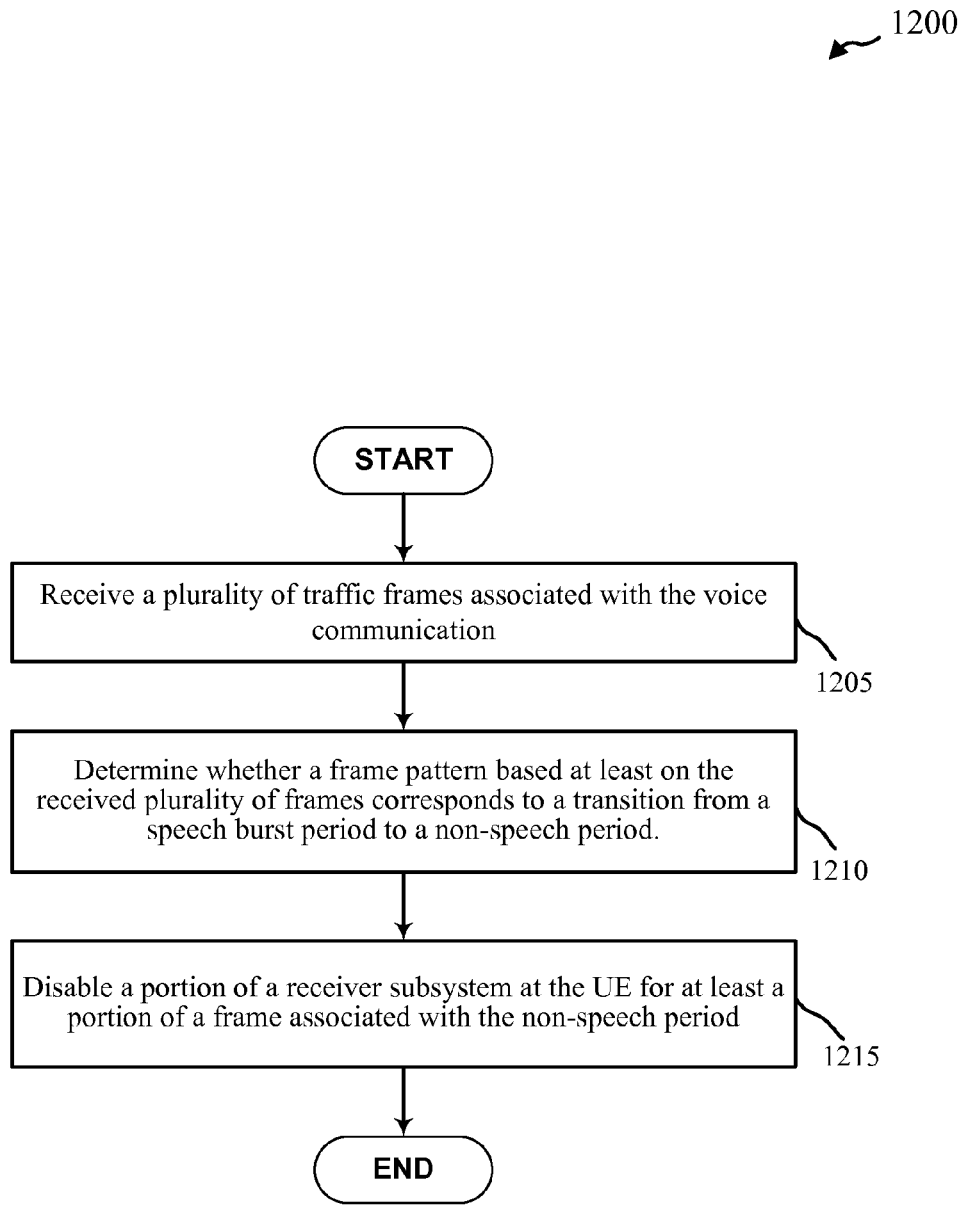
FIG. 12 shows a flow diagram of a method for supporting voice in a wireless communications system in accordance with various aspects of the present disclosure.

FIG. 12 illustrates an example method 1200 for reducing power consumption during a voice communication in a user equipment. In an aspect, at block 1205, method 1200 may include receiving a plurality of frames associated with the voice communication. For example, in an aspect, UE 115 (FIG. 1), receiver 340 (FIG. 3), and/or receiver 1010-a (FIG. 10A) may receive a plurality of frames of the voice communication. The plurality of traffic frames may be, for example, a voice communication that includes speech bursts and periods of silence.

Further, at block 1210, method 1200 may include determining whether a frame pattern based at least on the received plurality of frames corresponds to a transition from a speech burst period to a non-speech period. For example, in an aspect, UE 115 (FIG. 1), receiver 340 (FIG. 3), and/or receiver 1010-a (FIG. 10A) may determine that the plurality of frames comprise a frame pattern that corresponds to a transition from a speech burst period to a non-speech period.

Furthermore, at block 1215, method 1200 may include disabling a portion of a receiver subsystem at the UE for at least a portion of a frame associated with the non-speech period. For example, in an aspect, UE 115 (FIG. 1), receiver 340 (FIG. 3), and/or receiver 1010-a (FIG. 10A) may disable portions of the receiver subsystem for at least a portion of a frame that is associated with the non-speech period.

Figure 13:
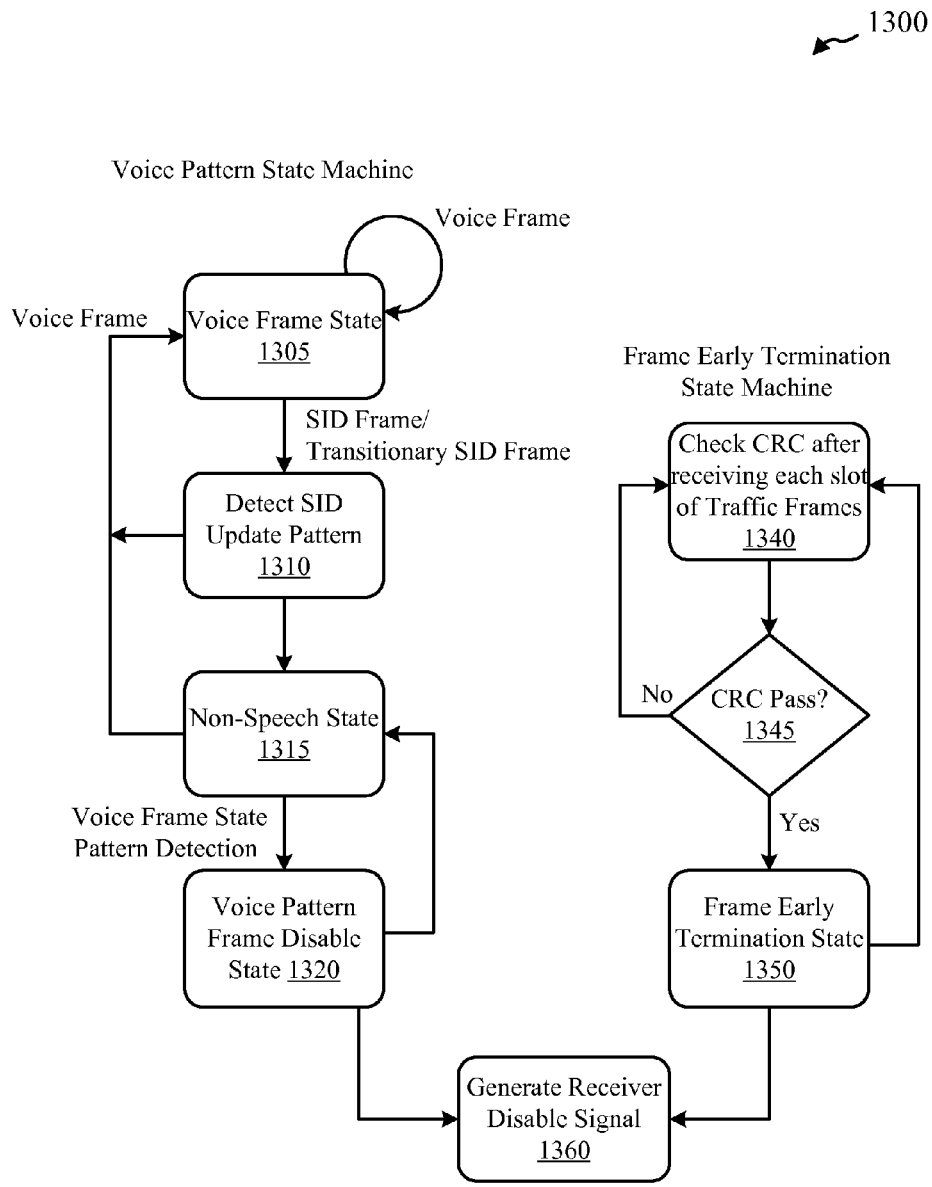
FIG. 13 shows a flow diagram of a method for supporting voice in a wireless communications system in accordance with various aspects of the present disclosure.

FIG. 13 illustrates, an aspect of method 1300 for reducing power consumption during voice communications in a wireless system 100. At block 1305, method 1300 may receive a plurality of frames associated with the voice communication. For example, in an aspect, UE 115 (FIGS. 1, 2, 10A, 10B) and/or devices 900-a, 900-b, may receive a plurality of frames. In an example aspect, one of the frames received may be a SID frame.

At block 1310, method 1300 may determine a SID update pattern. For example, in an aspect, UE 115 and/or devices 900-a, 900-b may detect multiple SID update cycles to determine the SID update period and/or pattern. Alternatively, in an aspect, block 1310 may be skipped if the first SID frame, for example, a transitionary SID, indicates the SID update period. Once the SID update period is established, method 1300 may enter non-speech state at block 1315.

At block 1315, method 300 determines whether a frame pattern based at least on the received plurality of frames corresponds to a non-speech period. For example, in an aspect, UE 115 and/or devices 900-a, 900-b may detect non-speech state when a SID frame is received followed by seven NULL frames.

At block 1320, method 1300 disables portions of a receiver sub-system at the UE for at least a portion associated with the non-speech period. For example, in an aspect, UE 115 and/or devices 900-a, 900-b may disable portions of the receiver subsystem for reducing power consumption at the UE. In an example state, if a voice frame and/or a transitory SID frame indicating a transition back to speech state is received, method 1300 may return to block 1305.

In an aspect, method 1300 may include blocks 1340, 1345, and 1350 that describe a state machine for performing early termination of traffic frames.

In an aspect, at block 1340, method 1300 may compute CRC for each traffic frame after receiving a subset of slots of the frame. For example, in an aspect, UE 110 and/or devices 900-a and/or 900-b may compute CRC for each traffic frame after receiving a subset of slots of the frame.

Further at block 1345, method 1300 determines whether CRC passed. For example, in an aspect, UE 110 and/or devices 900-a and/or 900-b may check if CRC passed. In an example aspect, when method 300 determines CRC failed, method 300 returns to block 1340 to continue checking until CRC passes for the frame.

Furthermore at block 1350, method 1300 may disable portions of the receiver until the end of the traffic frame. For example, in an aspect, UE 110 and/or devices 900-a and/or 900-b may disable portion of the receiver subsystem until the end of the frame In an additional aspect, at block 1360, method 1300 may include combing the disabling of portions of the receiver based on frame patterns and frame early termination into a single receiver disable signal that is used to disable subsystems or portions of subsystems of the receiver as described above. For example, The detailed description set forth above in connection with the appended drawings describes exemplary s and does not represent the only s that may be implemented or that are within the scope of the claims. The term "exemplary" used throughout this description means "serving as an example, instance, or illustration," and not "preferred" or "advantageous over other s." The detailed description includes specific details for the purpose of providing an understanding of the described techniques. These techniques, however, may be practiced without these specific details. In some instances, well-known structures and devices are shown in block diagram form in order to avoid obscuring the concepts of the described s.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but are to be accorded the widest scope consistent with the principles and novel features disclosed herein.

What is claimed is:

1. A method for reducing power consumption during a voice communication at a user equipment (UE), comprising:
   receiving a plurality of frames associated with the voice communication;
   determining, based at least on the received plurality of frames, whether a frame pattern corresponds to a first frame pattern indicating a transition from a speech burst period to a non-speech period and a second frame pattern indicating continuation of the non-speech period, wherein the first frame pattern includes a first silence insertion descriptor (SID) frame followed by one or more null frames and the second frame pattern includes a second SID frame followed by seven null frames; and
   disabling a portion of a receiver subsystem at the UE for at least a portion of a null frame of the second frame pattern.

2. The method of claim 1, wherein the disabling comprises:
   disabling the portion of the receiver subsystem for alternate null frames of the second frame pattern.

3. The method of claim 1, further comprising:
   detecting a first null frame of the second frame pattern; and
   disabling the portion of the receiver subsystem for a portion of a second null frame of the second traffic frame pattern that immediately follows the first null frame.

4. The method of claim 1, further comprising:
   determining that a first null frame of the second frame pattern is time aligned with a first portion of a control channel frame, the first portion of the control channel frame comprising at least a beginning of the control channel frame; and
   disabling the portion of the receiver subsystem for at least a portion of a second null frame of the second frame pattern that immediately follows the first null frame.

5. The method of claim 1, further comprising:
   receiving additional frames of the second frame pattern.

6. The method of claim 1, further comprising:
   decoding a null frame of the second frame pattern after receiving a subset of data of the null frame; and
   terminating the decoding of the null frame when a cyclic redundancy check (CRC) based on the subset is successful.

7. The method of claim 1, further comprising:
   determining a probability of a frame of the second frame pattern being a null frame based on a subset of data of the frame;
   comparing the probability to a null frame confidence threshold; and disabling the portion of the receiver for a remainder of the frame in response to determining that the probability exceeds the null frame confidence threshold.

8. The method of 7, wherein the disabling further comprises:
disabling the portion of the receiver subsystem for a remainder of the null frame when a cyclic redundancy check (CRC) based on the subset is successful.

9. The method of claim 8, further comprising:
sending, to a voice frame decoder of the UE, a frame quality indicator that indicates successful receipt of a frame when receipt of a portion of the frame was skipped due to the disabling of the portion of the receiver subsystem.

10. The method of claim 9, further comprising:
generating a comfort noise according to a most recent SID update frame based on the frame quality indicator without recognizing that the receipt of the traffic frame was skipped due to the disabling of the receiver.

11. An apparatus for reducing power consumption during a voice communication at a user equipment (UE), comprising:
means for receiving a plurality of frames associated with the voice communication;
means for determining, based at least on the received plurality of frames, whether a frame pattern corresponds to a first frame pattern indicating a transition from a speech burst period to a non-speech period and a second frame pattern indicating continuation of the non-speech period, wherein the first frame pattern includes a first silence insertion descriptor (SID) frame followed by one or more null frames and the second frame pattern includes a second SID frame followed by seven null frames; and
means for disabling a portion of a receiver subsystem at the UE for at least a portion of a null frame associated with of the second frame pattern.

12. The apparatus of claim 11, wherein the means for disabling is further configured to disable the portion of the receiver subsystem for alternate null frames of the second frame pattern.

13. A non-transitory computer readable medium storing computer executable code for reducing power consumption during a voice communication at a user equipment (UE), comprising:
code for receiving a plurality of frames associated with the voice communication;
code for determining, based at least on the received plurality of frames, whether a frame patterns corresponds to a first frame pattern indicating a transition from a speech burst period to a non-speech period and a second frame pattern indicating continuation of the non-speech period, wherein the first frame pattern includes a first silence insertion descriptor (SID) frame followed by one or more null frames and the second frame pattern includes a second SID frame followed by seven null frames; and
code for disabling a portion of a receiver subsystem at the UE for at least a portion of a null of the second frame pattern.

14. The computer readable medium of claim 13, wherein the code for the disabling further comprises code for disabling the portion of the receiver subsystem for alternate null frames of the second frame pattern.

15. The computer readable medium of claim 13, further comprising:
code for detecting a first null frame of the second frame pattern; and
code for disabling the portion of the receiver subsystem for a portion of a second null frame of the second traffic frame pattern that immediately follows the first null frame.

16. The computer readable medium of claim 13, further comprising:
code for determining that a first null frame of the second frame pattern is time aligned with a first portion of a control channel frame, the first portion of the control channel frame comprising at least a beginning of the control channel frame; and
code for disabling the portion of the receiver subsystem for at least a portion of a second null frame of the second frame pattern that immediately follows the first null frame.

17. An apparatus for reducing power consumption during a voice communication at a user equipment (UE), comprising:
a receiver to receive a plurality of frames associated with the voice communication;
a voice decoder to determine, based at least on the received plurality of frames, whether a frame pattern corresponds to a first frame pattern indicating a transition from a speech burst period to a non-speech period and a second frame pattern indicating continuation of the non-speech period, wherein the first frame pattern includes a first silence insertion descriptor (SID) frame followed by one or more null frames and the second frame pattern includes a second SID frame followed by seven null frames; and
a receiver power control module to disable a portion of a receiver subsystem at the UE for at least a portion of a null frame of the second frame pattern.

18. The apparatus of claim 17, wherein the receiver power control module is further configured to disable the portion of the receiver subsystem for alternate null frames of the second frame pattern.

19. The apparatus of claim 17, wherein the receiver power control module is further configured to detect a first null frame of the second frame pattern, and disable the portion of the receiver subsystem for a portion of a second null frame of the second traffic frame pattern that immediately follows the first null frame.

20. The apparatus of claim 17, further comprising: wherein the receiver power control module is further configured to determine that a first null frame of the second frame pattern is time aligned with a first portion of a control channel frame, the first portion of the control channel frame comprising at least a beginning of the control channel frame, and disable the portion of the receiver subsystem for at least a portion of a second null frame of the second frame pattern that immediately follows the first null frame.

21. The apparatus of claim 17, further comprising: wherein the receiver is further configured to receive additional frames of the second frame pattern.

22. The apparatus of claim 17, wherein the voice decoder is further configured to decode a null frame of the second frame pattern after receiving a subset of data of the null frame and terminate the decoding of the null frame when a cyclic redundancy check (CRC) based on the subset is successful.

23. The apparatus of claim 17, further comprising:
a null frame detection module to determine a probability of a frame of the second frame pattern being a null frame based on a subset of data of the frame and compare the probability to a null frame confidence threshold; and
the receiver power control module is further configured to disable the portion of the receiver for a remainder of the frame in response to determining that the probability exceeds the null frame confidence threshold.

24. The apparatus of 23, wherein the receiver power control module is further configured to disable the portion of the receiver subsystem for a remainder of the null frame when a cyclic redundancy check (CRC) based on the subset is successful.

25. The apparatus of claim 17, further comprising:
a frame decoder module or a voice state detection module to send, to a voice frame decoder of the UE, a frame quality indicator that indicates successful receipt of a frame when receipt of a portion of the frame was skipped due to the disabling of the portion of the receiver subsystem.

26. The apparatus of claim 25, wherein the voice decoder is further configured to generate a comfort noise according to a most recent SID update frame based on the frame quality indicator without recognizing that the receipt of the traffic frame was skipped due to the disabling of the receiver.

* * * * *